United States Patent
Furukawa et al.

(10) Patent No.: US 10,370,531 B2
(45) Date of Patent: Aug. 6, 2019

(54) CORE-SHELL POLYMER-CONTAINING EPOXY RESIN COMPOSITION, CURED PRODUCT THEREOF AND METHOD FOR PREPARING THE SAME

(71) Applicant: KANEKA CORPORATION, Osaka-shi (JP)

(72) Inventors: Yoshio Furukawa, Takasago (JP); Shohei Nishimori, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 306 days.

(21) Appl. No.: 15/028,614

(22) PCT Filed: Oct. 7, 2014

(86) PCT No.: PCT/JP2014/076858
§ 371 (c)(1),
(2) Date: Apr. 11, 2016

(87) PCT Pub. No.: WO2015/053289
PCT Pub. Date: Apr. 16, 2015

(65) Prior Publication Data
US 2016/0251510 A1    Sep. 1, 2016

(30) Foreign Application Priority Data

Oct. 11, 2013   (JP) .................................. 2013-213403

(51) Int. Cl.
| | |
|---|---|
| *C08L 63/00* | (2006.01) |
| *C08F 279/02* | (2006.01) |
| *C08F 283/12* | (2006.01) |
| *C08L 51/04* | (2006.01) |
| *C08F 265/06* | (2006.01) |

(52) U.S. Cl.
CPC ............ *C08L 63/00* (2013.01); *C08F 265/06* (2013.01); *C08F 279/02* (2013.01); *C08F 283/12* (2013.01); *C08L 51/04* (2013.01); *C08L 2207/53* (2013.01)

(58) Field of Classification Search
CPC ........ C08L 63/00; C08L 51/04; C08F 265/06; C08F 279/02; C08F 283/12
USPC ........................................................ 523/201
See application file for complete search history.

(56) References Cited

U.S. PATENT DOCUMENTS

| | | | |
|---|---|---|---|
| 4,476,285 A | 10/1984 | Crabtree et al. | |
| 6,410,640 B1 * | 6/2002 | Fukunaga ............ | C08G 65/336 524/588 |
| 2007/0027263 A1 | 2/2007 | Furukawa et al. | |
| 2009/0294057 A1 | 12/2009 | Liang et al. | |
| 2010/0099800 A1 | 4/2010 | Ueno et al. | |
| 2010/0204404 A1 | 8/2010 | Hongo | |
| 2012/0142863 A1 | 6/2012 | Miyamoto | |
| 2013/0115442 A1 | 5/2013 | Sang et al. | |
| 2018/0094176 A1 * | 4/2018 | Okamoto ............... | C09J 163/00 |

FOREIGN PATENT DOCUMENTS

| | | |
|---|---|---|
| EP | 2 123 711 A1 | 11/2009 |
| JP | 8-183836 A | 7/1996 |
| JP | 2005-255822 A | 9/2005 |
| JP | 2009-545656 A | 12/2009 |
| JP | 2010-84083 A | 4/2010 |
| JP | 2011-181525 A | 9/2011 |
| JP | 2012-92356 A | 5/2012 |
| JP | 5045239 B2 | 10/2012 |
| WO | 2005/028546 A1 | 3/2005 |
| WO | 2009/034966 A1 | 3/2009 |
| WO | 2010/143366 A1 | 12/2010 |

OTHER PUBLICATIONS

Extended Search Report dated May 31, 2017 in European Patent Application No. 14851926.7.
International Search Report dated Dec. 22, 2014 in PCT/JP14/76858 Filed Oct. 7, 2014.
Flory—Fox equation—Wikipedia at: https://en.wikipedia.org/wiki/Flory%E2%80%93Fox_equation accessed Aug. 20, 2018 (4 pages).
Fox Equation at: http://www.wernerbank.com/equat/Fox_equation15.htm accessed Jul. 31, 2018 (1 page).
Brostow et al, "Prediction of glass transition temperatures: Binary blends and copolymers", *Material Letters*, vol. 62, 2008, pp. 3152-3155.

\* cited by examiner

*Primary Examiner* — Hannah J Pak
(74) *Attorney, Agent, or Firm* — Oblon, McClelland, Maier & Neustadt, L.L.P.

(57) ABSTRACT

The present invention relates to a core-shell polymer-containing epoxy resin composition, wherein the composition contains 100 parts by weight of the epoxy resin (A) and 1 to 100 parts by weight of the core-shell polymer (B), the core-shell polymer has the volume average particle diameter of 0.01 to 1 μm, the core part of the core-shell polymer (B) has the glass transition temperature of less than 0° C., the shell part of the core-shell polymer (B) has the glass transition temperature of less than 25° C., and the shell part of the core-shell polymer (B) is polymerized with at least a monomer having an epoxy group.

17 Claims, No Drawings

CORE-SHELL POLYMER-CONTAINING EPOXY RESIN COMPOSITION, CURED PRODUCT THEREOF AND METHOD FOR PREPARING THE SAME

TECHNICAL FIELD

The present invention relates to a core-shell polymer-containing epoxy resin composition having lower viscosity, easy handling, and excellent impact-resistant adhesiveness, a cured product obtained from the same, and a method for preparing the same.

BACKGROUND ART

Curable resins represented by phenol resin, unsaturated polyester resin, epoxy resin and the like have been used widely in various fields due to excellent heat resistance, mechanical strength, dimensional accuracy and the like. Particularly, the epoxy resin has been used widely in construction materials, electric and electronic materials, adhesives, fiber reinforced composites and the like due to many merits such as excellent mechanical strength, electrical insulation, heat resistance, adhesive property and the like. However, there is a problem that the molded product obtained from the epoxy resin shows very brittle property due to small fracture toughness.

As a method for reinforcing toughness by adding a modifier to an epoxy resin, a method for adding a rubber component in the epoxy resin composition is known. As a method for adding a rubber component, there are known to be a method for adding a reactive liquid rubber (CTBN and the like) or a nitrile rubber, a method for mixing a core-shell polymer with an epoxy resin and the like (for example, Patent Document 1). However, since the reactive liquid rubber is subjected to phase separation at the time of curing after dissolving in the epoxy resin, there are problems that given modified effects are not obtained and the reproducibility of the quality is deteriorated by the change of morphologies of the cured products obtained according to the differences of the kinds of the epoxy resin compounded and the curing conditions. In addition, since the rubber component is partially dissolved and left in the epoxy resin phase after curing, there is a problem that the quality of the epoxy resin product is decreased and the like due to the decrease of the elastic modulus and glass transition temperature of the cured product.

In addition, a method for adding a core-shell polymer in an epoxy resin can control the decrease of the glass transition temperature. However, there is a problem that the core-shell polymer is separated by easily precipitating or floating a mixed core-shell polymer because the core-shell polymer is commercially available in powder of several ten micron meters to hundred micron meters as aggregate of the primary particles, and the core-shell polymer must be finely powdered to less than 10 μm, heated and agitated at the temperature of 50 to 200° C., and carefully mixed by high shear device, heat roll, intermixer, kneader, triple roll mill and the like in the case of mixing with the epoxy resin.

On the other hand, Patent Document 2 discloses a method for obtaining a resin composition in which the rubber polymer particles are favorably dispersed and impurities are small, by contacting a mixture of an aqueous latex containing the rubber polymer particles and an organic solvent having the partial solubility to water, with water to prepare the aggregate of the rubber polymer particles, separating the aqueous phase from the mixture of the aggregate and the aqueous phase to prepare the aggregate of the rubber polymer particle having impurities in a small amount, adding an organic solvent to the aggregate to prepare a dispersion, mixing the dispersion with a polymerizable organic compound having a reactive group such as an epoxy resin, and distilling a volatile component from the mixture. However, the shell layer of the core-shell polymer disclosed in this method has higher glass transition temperature (hereinafter referred to as Tg) than room temperature, and the composition contains a resin component having high Tg in which effects for improving the impact resistance of the epoxy resin is insufficient, so that there is room for further improvement.

In addition, Patent Documents 3 and 4 disclose a composition containing a core-shell polymer and a thermosetting resin, and the shell part of the core-shell polymer has Tg of 20° C. or less and a hydroxyl group. However, this core-shell polymer increases the viscosity of the composition, the handling becomes difficult, and the impact resistance is not exhibited in some cases, so that there is room for further improvement.

PRIOR ART DOCUMENTS

Patent Document

Patent Document 1: U.S. Pat. No. 4,476,285
Patent Document 2: WO 2005/028546
Patent Document 3: JP 5045239
Patent Document 4: JP 2012-092356

SUMMARY OF THE INVENTION

Problems to be Solved by the Invention

The object of the present invention is to provide a core-shell polymer-containing epoxy resin composition having the excellent dispersibility of the core-shell polymer to the epoxy resin, and the excellent dispersibility of the core-shell polymer after curing, and excellent mechanical property, particularly excellent effect for improving impact-resistant adhesiveness, and preferably having lower viscosity and easy handling.

Solutions to the Problems

The inventors have found that the problem is solved by containing a given core-shell polymer (B) having an epoxy group on the shell part in the epoxy resin at a given state, to complete the core-shell polymer-containing the epoxy resin composition having excellent mechanical property, particularly excellent effect for improving the impact-resistant adhesiveness.

Specifically, the present invention relates to a core-shell polymer-containing epoxy resin composition, wherein the composition comprises 100 parts by weight of the epoxy resin (A) and 1 to 100 parts by weight of the core-shell polymer (B), the core-shell polymer has the volume average particle diameter of 0.01 to 1 μm, the core part of the core-shell polymer (B) has the glass transition temperature of less than 0° C., the shell part of the core-shell polymer (B) has the glass transition temperature of less than 25° C., and the shell part of the core-shell polymer is polymerized with at least a monomer having an epoxy group.

In the preferred embodiment of the core-shell polymer-containing the epoxy resin composition, the core part of the core-shell polymer (B) comprises a rubber elastic body containing 50% by weight or more of one or more monomers selected from the group consisting of diene monomer and (meth)acrylate ester monomer, and 0% by weight or more and less than 50% by weight of other copolymerizable vinyl monomer; polysiloxane rubber elastic body; or a mixture thereof, the other copolymerizable vinyl monomer contains one or more monomers selected from an aromatic vinyl compound, a vinyl cyanide compound, an unsaturated acid derivative, a (meth)acrylate amide derivative, a maleimide derivative, and a vinyl ether monomer.

In the preferred embodiment of the core-shell polymer-containing the epoxy resin composition, the shell part of the core-shell polymer (B) contains an alkoxy group or an aryloxy group-containing (meth) acrylate ester unit, an epoxy group-containing (meth) acrylate ester unit, and as necessary other monomer unit such that the glass transition temperature calculated by FOX formula is less than 25° C.

In the more preferred embodiment of the core-shell polymer-containing the epoxy resin composition, the shell part of the core-shell polymer (B) is polymerized with 5 to 99% by weight of one or more monomers selected from the group consisting of alkoxy alkyl (meth) acrylate, methyl acrylate and ethyl acrylate, and 1 to 50% by weight of one or more monomers selected from the group consisting of glycidyl (meth)acrylate, allyl glycidyl ether, and glycidyl alkyl (meth) acrylate, and 0 to 50% by weight of other vinyl monomer.

In the more preferred embodiment of the core-shell polymer-containing the epoxy resin composition, the shell part of the core-shell polymer (B) is polymerized with 5 to 99% by weight of 2-alkoxy ethyl (meth)acrylate, 1 to 50% by weight of one or more monomers selected from the group consisting of glycidyl (meth) acrylate, allyl glycidyl ether, and glycidyl alkyl(meth)acrylate, and 0 to 50% by weight of other vinyl monomer.

In the more preferred embodiment of the core-shell polymer-containing the epoxy resin composition, the shell part of the core-shell polymer (B) is polymerized with 5 to 99% by weight of 2-methoxy ethyl acrylate, 1 to 50% by weight of one or more monomers selected from the group consisting of glycidyl (meth) acrylate, allyl glycidyl ether, and glycidyl alkyl(meth)acrylate, and 0 to 50% by weight of other vinyl monomer.

In the more preferred embodiment of the core-shell polymer-containing the epoxy resin composition, the shell part of the core-shell polymer (B) has the glass transition temperature of less than 20° C.

In the more preferred embodiment of the core-shell polymer-containing the epoxy resin composition, the core-shell polymer (B) comprises an intermediate layer between the core part and the shell part, and the intermediate layer is polymerized with 30 to 100% by weight of a multifunctional monomer, and 0 to 70% by weight of the other vinyl monomer.

In addition, the present invention relates to a cured product of the core-shell polymer-containing the epoxy resin composition, wherein the core-shell polymer (B) is dispersed at the state of the primary particle in the cured product.

Further, the present invention relates to a method for preparing a core-shell polymer-containing epoxy resin composition, comprising:

the first step of mixing an aqueous media dispersion dispersing the core-shell polymer (B) in an aqueous media with an organic solvent having the solubility to water at 20° C. of from 5% by weight to 40% by weight, and mixing the resulting mixture with excess water to prepare a loose aggregate of the core-shell polymer (B), the second step of separating aggregate of the core-shell polymer (B) from the liquid phase, mixing the collected core-shell polymer with an organic solvent to prepare a dispersion containing the core-shell polymer and the organic solvent, and the third step of mixing the dispersion containing the core-shell polymer and the organic solvent with the epoxy resin to distill the organic solvent.

Effects of the Invention

According to the present invention, the core-shell polymer-containing the epoxy resin composition having the excellent dispersibility of the core-shell polymer and excellent impact-resistant adhesiveness can be provided. More preferably, the core-shell polymer-containing epoxy resin composition having lower viscosity, easy handling and excellent effect for improving impact-resistant adhesiveness can be provided.

MODE FOR CARRYING OUT THE INVENTION (Epoxy Resin (A))

An epoxy resin used in the present invention is not limited particularly as long as the epoxy resin is a compound having an epoxy group. Preferably, the epoxy resin is an epoxy resin called as polyepoxide. The epoxy resin includes polyglycidyl ether such as addition reaction products of polyhydric phenol such as bisphenol bisphenol F, biphenol, phenol novolac with epichlorohydrin, polyglycidylamine compound from monoamine and polyamine such as aniline, diaminobenzene, aminophenol, phenylenediamine, diaminophenylether, alicyclic epoxy resin having an alicyclic epoxy structure such as cyclohexylepoxy, addition reaction products of polyhydric alcohols and epichlorohydrin, halogenated epoxy resin in which hydrogen is partially substituted with halogen elements such as bromine, homopolymer or copolymer from the polymerization of monomers containing unsaturated monoepoxide such as allylglycidyl ether. The epoxy resin may be used in one kind or two or more kinds. Many polyepoxide synthesized from polyhydric phenols is disclosed in U.S. Pat. No. 4,431,782. The examples of the polyepoxide include U.S. Pat. No. 3,804,735, 3,892,819, 3,948,698, 4,014,771, and those disclosed in epoxy resin handbook (Nikkan Kogyo Shimbun, 1987).

In addition, polyalkylene glycol diglycidyl ether, glycol diglycidyl ether, diglycidyl ester of aliphatic polybasic acid, glycidyl ether of polyvalent aliphatic alcohol, and divinylbenzene dioxide can be used as the epoxy resin (A). These are epoxy resins having relatively lower viscosity, and serve as a reactive diluent in the case where these are used with other epoxy resins such as bisphenol A epoxy resin and bisphenol F epoxy resin. Then, the balance between the viscosity of the composition and the physical property of the cured product can be iii roved. The amount of these epoxy resin is preferably 0.5 to 20% by weight, more preferably 1 to 10% by weight, and even preferably 2 to 5% by weight of 100% by weight of the epoxy resin W.

The polyalkylene glycol diglycidyl ether includes polyethylene glycol diglycidyl ether, polypropylene glycol diglycidyl ether and the like. The glycol diglycidyl ether includes diglycidyl ethers of aliphatic diol such as neopentyl glycol diglycidyl ether, 1,4-butanediol diglycidyl ether, 1,6-hexanediol diglycidyl ether, cyclohexane dimethanol diglycidyl ether and the like. The diglycidyl ester of the aliphatic polybasic acid includes diglycidyl ester of dimer acid, diglycidyl ester of adipic acid, diglycidyl ester of sebacic acid, diglycidyl ester of maleic acid. The glycidyl ether of polyvalent aliphatic alcohol (particularly, tervalant or higher aliphatic alcohol) includes trimethylol propane triglycidyl ether, trimethylol ethane triglycidyl ether, caster oil modified polyglycidyl ether, propoxylated glycerin triglycidyl ether, sorbitol polyglycidyl ether and the like.

An epoxy compound obtained from the addition reaction of polybasic acid and the like to an epoxy resin as described in WO 2010/098950 can be used as the epoxy resin W. For example, such epoxy compound includes addition reaction products of the dimmer of talloil fatty acid (dimmer acid) and bisphenol A epoxy resin. In addition, chelate-modified epoxy resin, rubber-modified epoxy resin, and urethane-modified epoxy resin also can be used as the epoxy resin (A).

The epoxy resin which can be used in the present invention is as mentioned above, and the epoxy resin generally has the epoxy equivalent of 80 to 2000. These epoxy resins can be obtained by conventional methods, and a method for reacting epihalohydrin in excess amount to polyhydric alcohol or polyhydric phenol under the presence of base is often used.

The epoxy resin (A) may be used individually or in the combination of two or more kinds. Among the epoxy resins, bisphenol A epoxy resin and bisphenol F epoxy resin are preferable in the view of high elastic modulus of cured products obtained, excellent heat resistance and adhesiveness, and relatively inexpensive materials, and bisphenol A epoxy resin is particularly preferable.

In addition, among various epoxy resins, the epoxy resin has preferably the epoxy equivalent of less than 220, more preferably the epoxy equivalent of 90 or more and less than 210, and even preferably the epoxy equivalent of 150 or more and less than 220 in the view of the high elastic modulus and heat resistance of the cured product obtained.

Particularly, bisphenol A epoxy resin and bisphenol F epoxy resin having the epoxy equivalent of less than 220 are preferable because these are liquid in ambient temperature and the handling of the obtained resin composition is good.

Bisphenol A epoxy resin and bisphenol F epoxy resin having the epoxy equivalent of 220 or more and less than 2000 are contained in the amount of preferably 40% by weight or less, more preferably 20% by weight or less of 100% by weight of the epoxy resin (A) in the view of excellent impact resistance of the cured products obtained.

The amount of the chelate-modified epoxy resin is preferably 0.1 to 10% by weight, more preferably 0.5 to 3% by weight of 100% by weight of the epoxy resin (A). The chelate-modified epoxy resin is a reaction product of the epoxy resin and a compound containing a chelate functional group (chelate ligand). In the case of adding the chelate-modified epoxy resin to the resin composition of the present invention to use as adhesive for a vehicle, adhesiveness to the surface of the metal material polluted with oily substances can be improved. The chelate functional group is a functional group of a compound having multiple coordinations capable of chelating with metal ions in a molecule, and includes an acid group containing phosphorus (for example, $-PO(OH)_2$), a carboxyl group ($-CO_2H$), an acid group containing sulfur (for example, $-SO_3H$), an amino group and a hydroxyl group (particularly, hydroxyl groups neighboring each other in an aromatic ring) and the like. The chelate ligand includes ethylenediamine, bipyridine, ethylenediamine tetraacetic acid, phenanthroline, porphyrin, crown ether and the like. A commercially available chelate-modified epoxy resin includes adeka resin EP-49-10N manufactured by ADEKA CORPORATION.

The amount of the rubber-modified epoxy resin and/or the urethane-modified epoxy resin is preferably 40% by weight or less, and more preferably 20% by weight or less of 100% by weight of the epoxy resin (A). In the case of adding in such an amount, the cured product obtained has excellent impact resistance.

The rubber-modified epoxy resin is a reaction product having 1.1 or more of epoxy groups on average per one molecule obtained by reacting the rubber and the epoxy group-containing compound. The rubber includes rubber polymer such as acrylonitrile butadiene rubber (NBR), styrene butadiene rubber (SBR), hydrogenated nitrile rubber (HNBR), ethylenepropylene rubber (EPDM), acrylate rubber (ACM), butyl rubber (IIR), butadiene rubber, polyoxyalkylene such as polypropyleneoxide, polyethylene oxide, polytetramethylene oxide and the like. The rubber polymer has preferably a reactive group such as an amino group, a hydroxyl group, or a carboxyl group at terminal. The rubber-modified epoxy resin used in the present invention is a reaction product obtained by reacting these rubber polymer and the epoxy resin at appropriate compounding ratio according to known methods. Among these, acrylonitrile-butadiene rubber modified epoxy resin and polyoxyalkylene modified epoxy resin are preferable in the view of the adhesiveness of the obtained resin composition and the adhesiveness to peel and impact, and acrylonitrile-butadiene rubber modified epoxy resin is more preferable. For example, acrylonitrile-butadiene rubber modified epoxy resin is obtained by the reaction of NBR having carboxyl group at terminal (CTBN) with bisphenol A epoxy resin. In addition, polyoxyalkylene modified epoxy resin is obtained by the reaction of polyoxyalkylene having amino group at terminal and bisphenol A epoxy resin.

The amount of acrylonitrile monomer is preferably 5 to 40% by weight, more preferably 10 to 35% by weight, and even preferably 15 to 30% by weight of 100% by weight of the acrylonitrile-butadiene rubber in the view of the adhesiveness of the obtained resin composition and the adhesiveness to impact and peel. The amount of acrylonitrile monomer is particularly preferably 20 to 30% by weight of 100% by weight of the acrylonitrile-butadiene rubber in the view of the thixotropy of the obtained resin composition.

The average number of epoxide reactive terminal group per one molecule of the rubber-modified epoxy resin is preferably 1.5 to 2.5, more preferably 1.8 to 2.2. The rubber-modified epoxy resin has the number average molecular weight of preferably 2000 to 10000, more preferably 3000 to 8000, and even preferably 4000 to 6000, based on the molecular weight of polystyrene measured by GPC.

The method for manufacturing the rubber-modified epoxy resin is not limited particularly, and can be prepared by reacting the rubber and the epoxy group-containing compound in the epoxy group-containing compound at a large amount. Concretely, it is preferable to prepare the rubber-modified epoxy resin by reacting the epoxy group-containing compound having 2 or more equivalents per one equivalent of epoxy reactive terminal of the rubber. It is more preferable to prepare the rubber-modified epoxy resin by reacting the epoxy group-containing compound in a sufficient amount such that the obtained product is a mixture of adduct of the rubber and the epoxy group-containing compound and the free epoxy group-containing compound. The rubber-modified epoxy resin is prepared by heating at 100 to 250° C. under the presence of catalyst such as phenyldimethyl urea and triphenylphosphine. The epoxy group-containing compound used in the preparation of the rubber modified epoxy resin is not limited particularly. The epoxy group-containing compound is preferably bisphenol A epoxy resin and bisphenol F epoxy resin, and more preferably bisphenol A epoxy resin. In the case where the epoxy group-containing compound is used in an excess amount for the preparation of the rubber-modified epoxy resin, the rubber-modified epoxy resin does not contain the unreacting and remaining epoxy group-containing compound after reaction.

The rubber-modified epoxy resin can be modified by preliminarily reacting bisphenol component. The amount of bisphenol component used for the modification is 3 to 35 parts by weight, 5 to 25 parts by weight of 100 parts by weight of the rubber component of the rubber-modified epoxy resin. A cured product of a resin composition containing a modified rubber-modified epoxy resin has excellent adhesive durability after subjecting to high temperature and excellent impact resistance at lower temperature.

The glass transition temperature (Tg) of the rubber-modified epoxy resin is not limited particularly. The rubber-modified epoxy resin has the glass transition temperature of preferably −25° C. or less, more preferably −35° C. or less, even preferably −40° C. or less, and particularly preferably −50° C. or less.

The amount of the rubber-modified epoxy resin is preferably 1 to 40% by weight, more preferably 3 to 30% by weight, 5 to 25% by weight, and particularly preferably 10 to 20% by weigh of 100% by weight of the epoxy resin (A). In the case of less than 1% by weight, the cured product obtained becomes brittle and exhibits lower impact-resistant adhesiveness in some cases. In the case of more than 40% by weight, the cured product obtained exhibits lower heat resistance and elastic modulus (rigidity) in some cases. The rubber-modified epoxy resin can be used individually or in the combination of two or more kinds.

The urethane-modified epoxy resin is a reaction product having 1.1 or more epoxy groups on average per one molecule obtained by reacting a compound having a group having a reactiveness to isocyanate group and an epoxy group, and a urethane prepolymer containing isocyanate group. For example, the urethane-modified epoxy resin is obtained by reacting an epoxy compound having a hydroxyl group and a urethane prepolymer.

The amount of the urethane-modified epoxy resin is preferably 1 to 40% by weight, more preferably 3 to 30% by weight, even preferably 5 to 25% by weight, and particularly preferably 10 to 20% by weight of 100% by weight of the epoxy resin (A). In the case of less than 1% by weight, the cured product obtained becomes brittle and exhibits lower impact-resistant adhesiveness in some cases. In the case of more than 40% by weight, the cured product obtained exhibits lower heat resistance and elastic modulus (rigidity) in some cases. The urethane-modified epoxy resin can be used individually or in the combination of two or more kinds.

The epoxy resin used in the present invention may contain monoepoxide as reactive diluent. The reactive diluent includes an aliphatic glycidyl ether such as butyl glycidyl ether, an aromatic glycidyl ether such as phenyl glycidyl ether, cresyl glycidyl ether, ethers containing glycidyl group and alkyl group of 8 to 10 carbon atoms such as 2-ethylhexylglycidylether, ethers containing glycidyl group and phenyl group of 6 to 12 carbon atoms which may be substituted with alkyl group of 2 to 8 carbon atoms such as p-tert butyl phenyl glycidyl ether, ethers containing glycidyl group and alkyl group of 12 to 14 carbon atoms such as monoglycidyl ether neodecanoic acid, aliphatic glycidyl ester such as glycidyl (meth) acrylate, glycidyl maleate, glycidyl ester of aliphatic carboxylic acid of 8 to 12 carbon atoms such as versatic acid glycidyl ester, lauric acid glycidyl ester, p-t-butyl benzoic acid glycidyl ester and the like.

The amount of the monoepoxide is preferably 0.1 to 20% by weight, more preferably 0.5 to 10% by weight, and particularly preferably 1 to 5% by weight of 100% by weight of the epoxy resin (A). In the case of less than 0.1% by weight, effect for lower viscosity is not sufficient in some cases, and in the case of more than 20% by weight, the physical property such as adhesiveness is decreased in some cases.

(Core-Shell Polymer (B))

The core-shell polymer of the present invention requires the volume average particle diameter of 0.01 to 1 μm, and preferably 0.05 to 0.8 μm in the view of obtaining the core-shell polymer-containing epoxy resin composition having preferred viscosity and impact-resistant adhesiveness. The core-shell polymer may be a mixture of core-shell polymers having different volume average particle diameters, and may be a core-shell polymer having multipeaks such as peaks of particle number near each volume average particle diameter.

In the case where the mixture of core-shell polymers having different volume average particle diameter is used, a core-shell polymer having the volume average particle diameter of, for example, 0.01 to 0.20 μm, preferably 0.05 to 0.15 μm, and a core-shell polymer having the volume average particle diameter of 0.10 to 1.0 μm, preferably 0.15 to 0.9 μm may be mixed. When the core-shell polymer is used in the mixture having different volume average particle diameters or the mixture having multipeaks (for example, two peaks), the core-shell polymer-containing epoxy resin composition has lower viscosity, and is easily handled.

The core-shell polymer has at least two layers of the core part of the inner of the core-shell polymer and the shell part of the outermost of the core-shell polymer, and the core part is the rubber polymer having Tg of less than 0° C. Preferably, the core-shell polymer of the present invention is a core-shell polymer obtained by graft-polymerizing a monomer capable of graft-polymerizing to form the shell part (a monomer for forming the shell part) under the presence of the rubber polymer (the core part). The core-shell polymer has the structure of which the rubber polymer is located at the inside of the core-shell polymer and at least one shell part is graft-polymerized on the surface of the rubber polymer and covers the surrounding or the part of the rubber polymer.

The weight ratio of the core part and the shell part of the present invention is preferably 50/50 to 99/1 as core part/shell part (weight ratio of monomers for forming each polymer), more preferably 60/40 to 95/5, and even preferably 70/30 to 95/5 in the view of the lower viscosity and the easy handling of the core-shell polymer-containing epoxy resin composition of the present invention, the view of stably dispersing the core-shell polymer at the state of the primary particle in the composition, and the view of providing sufficient impact-resistant adhesiveness with the cured product of the core-shell polymer-containing epoxy resin composition of the present invention.

(Core Part (Rubber Polymer))

In the present invention, the polymer for constituting the rubber polymer is preferably crosslinked. The crosslinked rubber polymer can be swelled to an appropriate solvent and is not substantially dissolved in the solvent. In addition, the crosslinked rubber polymer is insoluble to the epoxy resin. The rubber polymer or the crosslinked rubber polymer has the gel content of, for example, 60% by weight or more, preferably 80% by weight or more, more preferably 90% by weight or more, and even preferably 95% by weight or more. The polymer for constituting the rubber polymer or the crosslinked rubber polymer has Tg of less than 0° C., preferably less than −10° C., more preferably less than −20° C., and even preferably less than −40° C.

A polymer for constituting the rubber polymer includes a rubber elastic body comprising 50% by weight or more of one or more monomers selected from the group consisting of a diene monomer (conjugated diene monomer) and (meth) acrylate ester monomer and 0 to 50% by weight of other polymerizable vinyl monomer, a polyorganosiloxane rubber elastic body, or a mixture thereof. In the specification, (meth)acrylate means acrylate and/or methacrylate.

A conjugated diene monomer for constituting the rubber polymer includes an alkanediene monomer of about 4 to 8 carbon atoms such as butadiene, isoprene, chroloprene. The conjugated diene monomer is preferably butadiene. The (meth)acrylate ester monomer includes 3 to 15 carbon atoms alkyl (meth)acrylates such as butylacrylate, 2-ethylhexylacrylate and lauryl methacrylate. The conjugated diene monomer is particularly preferably butyl acrylate and 2-ethylhexyl acrylate. These monomers may be used individually or in combination of two or more monomers.

The amount of at least one monomer selected from the group consisting of conjugated diene monomer and (meth) acrylate ester monomer is preferably 50% by weight or more, more preferably 60% by weight or more, and particularly preferably 70% by weight or more per 100% by weight of the whole rubber polymer. When the amount of the monomer is less than 50% by weight, effect for improving impact-resistant adhesiveness exhibited by the core-shell polymer of the present invention is decreased in some cases.

The rubber polymer may be a copolymer obtained by polymerizing conjugated diene monomer or (meth) acrylate ester monomer with other polymerizable vinyl monomer. The vinyl monomer capable of copolymerizing with the conjugated diene monomer or (meth) acrylate ester monomer includes a monomer selected from an aromatic vinyl monomer, a vinyl cyanide monomer, an unsaturated acid derivative, a (meth) acrylate amide derivative, a maleimide derivative, and a vinyl ether monomer. The aromatic vinyl monomer includes styrene, α-methylstyrene, vinylnaphthalene. The vinyl cyanide monomer includes (meth)acrylonitrile and substituted acrylonitrile. The unsaturated acid derivative includes α,β-unsaturated acid, α,β-unsaturated acid anhydride, itaconic acid, crotonic acid and the like. The (meth)acrylate amide derivative includes (meth)acrylamide (containing N-substituted body) and the like.

The maleimide derivative includes maleic acid anhydride, maleic acid imide and the like. The vinyl ether monomer includes 2-chloroethylvinyl ether and the like. These may be used individually or in the combination of two or more kinds.

The amount of the copolymerizable vinyl monomer is preferably less than 50% by weight, and more preferably less than 40% by weight per 100% by weight of the whole rubber polymer. The amount of the copolymerizable vinyl monomer may be less than 10% by weight or 0% by weight.

The rubber polymer may be polymerized with a multifunctional monomer so as to control the degree of crosslink. The multifunctional monomer can be exemplified by divinylbenzene, butanediol di(meth)acrylate, triallyl (iso)cyanurate, allyl(meth)acrylate, diallylitaconic acid, diallylphthalic acid and the like. The amount of the multifunctional monomer is, for example, 10% by weight or less, preferably 5% by weight or less, more preferably 3% by weight or less per 100% by weight of the whole rubber polymer. When the amount is more than 10% by weight, effect for improving impact-resistant adhesiveness exhibited by the core-shell polymer of the present invention is decreased in some cases. In the case of using the multifunctional monomer, the amount of the multifunctional monomer may be 0.1% by weight or more, or 1% by weight or more per 100% by weight of the whole rubber polymer.

A chain transfer agent may be used so as to control the molecular weight or the degree of crosslink of the polymer for constituting the rubber polymer. The chain transfer agent can be alkylmercaptane of 5 to 20 carbon atoms. The amount of the chain transfer agent is, for example, 5% by weight or less, and preferably 3% by weight or less per 100% by weight of the whole rubber polymer. When the amount of the chain transfer agent is more than 5% by weight, the amount of the uncrosslinked component of the rubber polymer and the viscosity of the epoxy resin composition of the present invention is increased, the handling becomes difficult, heat resistance, rigidity of the cured product obtained from the epoxy resin composition are negatively affected in some cases.

The polysiloxane elastic rubber can be used in place of the rubber polymer or in the combination with the rubber polymer.

When the polysiloxane elastic rubber is used as the rubber polymer, a polysiloxane rubber containing alkyl- or aryl-2-substituted silyloxy units such as dimethyl silyloxy, methylphenyl silyloxy, diphenyl silyloxy and the like. In addition, when the polysiloxane rubber is used, if necessary, it is preferable that the crosslinked structure is previously introduced in the polysiloxane by partially using a multifunctional alkoxysilane or radically reacting a silane compound having a vinyl reactive group such as (meth)acryloyloxy group-containing alkoxysilane such as (meth) acryloyloxypropylmethyldimethoxysilane, (meth)acryloyloxypropyltrimethoxysilane at the time of polymerization.

(Shell Part)

In the present invention, the shell part is a polymer (shell polymer) polymerized with a monomer for forming the shell layer. The shell layer comprises a polymer for improving the compatibility of the core-shell polymer and the epoxy resin and dispersing the core-shell polymer in the state of primary particle in the core-shell polymer-containing epoxy resin composition or the cured product obtained therefrom of the present invention.

Further, the shell part has Tg of less than 25° C., preferably less than 20° C., more preferably less than 0° C., even preferably less than −20° C., and particularly preferably less than −40° C. in order to provide effect for improving impact-resistant adhesiveness with the core-shell polymer-containing epoxy resin composition. Tg of the shell part is not limited particularly as long as the homopolymer or the copolymer polymerized with two or more monomers has Tg of less than 20° C. The lower limit of Tg of the shell part may be, for example, −80° C. or −70° C. $Tg_n$ of copolymer can be calculated with FOX formula (numerical formula 1) as follows.

$$1/Tg_n = w_1/Tg_1 + w_2/Tg_2 + \ldots + w_n/Tg_n \quad \text{(numerical formula 1)}$$

$Tg_1, Tg_2, \ldots Tg_n$ is Tg (K) of the homopolymer polymerizing with component 1, 2, ..., or n, and $w_1, w_2, \ldots, w_n$ is weight percentage of component 1, 2, ..., n. In addition, as to Tg of the homopolymer, numerical values and the like described in Polymer Handbook Fourth Edition (edited by J. Brandup at el., 1999, John Wiley & Sons, Inc.) can be used. Further, in the case of new polymer, peak temperature of loss tangent (tan δ) of viscoelasticity measuring method (shearing method, measuring frequency: 1 Hz) may be adapted as Tg.

In the present invention, the shell part is preferably graft-bonded with the rubber polymer. More concretely, it is preferable that the shell part is chemically bonded with the core part by graft-polymerizing the monomer for forming the shell part with the core part for forming the rubber polymer. The ratio of the shell part chemically bonded with the core part is 50 to 100% by weight, more preferably 80 to 100% by weight, even preferably 90 to 100% by weight, and particularly preferably 95 to 100% by weight per 100% by weight of the shell part. When the ratio of the shell part chemically bonded with the core part is less than 50% by weight, the viscosity of the epoxy resin composition becomes high, the heat resistance of the cured product obtained by curing the epoxy resin composition is decreased in some cases. The polymerization can be carried out by adding the monomer for forming the shell part to the latex of core polymer prepared in the state of the aqueous polymer latex to polymerize these. The aqueous latex containing the polymer can be prepared according to well-known methods such as emulsion polymerization, miniemulsion polymerization, micro-suspension polymerization and the like.

(Composition of Shell Part)

The shell part is polymerized with at least a monomer having an epoxy group as constituent unit. The monomer having an epoxy group is not limited particularly as long as the monomer is used as a part of the monomer for forming the shell part and has ethylenically unsaturated double bonds and epoxy group in the same molecule in the view of the chemical bond of the core-shell polymer and the epoxy resin in order to disperse the core-shell polymer of the present invention at the state of primary particle in the cured product of the epoxy resin composition. The monomer having an epoxy group includes ether compounds such as allyl glycidyl ether; ester compounds such as glycidyl (meth)acrylate, allyl glycidyl ether, glycidyl alkyl(meth)acrylate (particularly, an epoxy group-containing (meth)acrylate ester). These may be used individually or in the combination of two or more monomers.

The ratio of the monomer having an epoxy group is, for example, 3 to 60% by weight, preferably 5 to 50% by weight, more preferably 10 to 45% by weight per 100% by weight of the total monomer for constituting the shell part.

The shell part may be polymerized with a monomer other than the monomer having an epoxy group as constituent unit, and the monomers described in the shell part can be used with the monomer having an epoxy group. The monomer having an epoxy group is useful for the improvement of the dispersibility, and has high Tg of homopolymer in some cases. The monomer having high Tg contains an epoxy group-containing (meth)acrylate ester. Therefore, when high Tg monomer (an epoxy group-containing (meth)acrylate ester) is used for the improvement of the dispersibility, it is recommended that the shell part is constituted in the combination with lower Tg monomer in order to decrease Tg of the shell part up to a given value.

The lower Tg monomer includes an alkoxy group or an aryloxy group-containing (meth)acrylate ester, C3 to 10 alkyl (meth)acrylate ester (for example, butyl (meth) acrylate), hydroxyl C3 to 10 alkyl (meth) acrylate ester (for example, 4-hydroxybutyl (meth) acrylate) and the like. In the case of using such a lower Tg monomer, the impact-resistant adhesiveness can be improved.

The aryloxy group-containing (meth) acrylate ester includes aryloxy C1-4 alkyl (meth)acrylate ester such as phenoxy ethyl (meth)acrylate.

The alkoxy group-containing (meth) acrylate ester includes methacrylic acid alkyl ester in which an alkoxy group or the connecting group thereof (alkoxyalkoxy group) is bonded to alkyl group, and is referred to as alkoxyalkyl (meth)acrylate. In the specification, alkoxyalkyl (meth) acrylate is a monomer used as a part of the monomer for forming the shell part in the view of dispersing the core-shell polymer at the state of primary particle in the epoxy resin, the view of the compatibility of the shell polymer to the epoxy resin, and the view of providing a given polarity to the shell polymer. The alkoxy alkyl(meth) acrylate includes esters of C1 to 4 alkyl alcohol to which C1 to 4 alkoxy group or connecting group of two to four C1 to 4 alkoxy groups is bonded with (meth)acrylate such as 2-methoxyethyl(meth) acrylate, 2-ethoxyethyl (meth) acrylate, 2-(2-ethoxyethoxy) ethyl (meth) acrylate. 2-methoxyethylacrylate, 2-ethoxyethylacrylate, and 2-(2-ethoxyethoxy) ethyl acrylate are preferable. 2-methoxyethylacrylate is particularly preferable in the view of the availability and the economy. These may be used individually or in the combination of two or more monomers.

The lower Tg monomer is preferably the alkoxy group or aryloxy group-containing (meth) acrylate ester, and particularly preferably the alkoxy group-containing (meth) acrylate ester. The alkoxy group-containing (meth) acrylate ester is advantage in that the viscosity of the composition is decreased on compounding the core-shell polymer to the epoxy resin, compared with the aryloxy group-containing (meth) acrylate ester, and the handling can be improved further.

In addition, the lower Tg monomer is preferably the alkoxy group or aryloxy group-containing acrylate ester. The alkoxy group or aryloxy group-containing acrylate ester can improve the impact-resistant adhesiveness at lower temperature (for example, −20 to −40° C.), compared with the alkoxy group or aryloxy group-containing methacrylate ester. The lower Tg monomer is particularly preferably the alkoxy group-containing acrylate ester.

The ratio of the lower Tg monomer can be set such that the glass transition temperature of the shell part calculated with FOX formula is less than 25° C. The amount of the lower Tg monomer is, for example, 30 to 97% by weight, preferably 40 to 95% by weight, more preferably 50 to 90% by weight of 100% by weight of the total monomer of the shell part.

(Other Vinyl Monomer A, B)

In the shell part, as the monomer other than the monomer having an epoxy group, the usable monomer includes alkyl (meth)acrylate such as methyl acrylate, and ethyl acrylate, and the multifunctional monomer (allyl (meth)acrylate) in addition to the lower Tg monomer (these monomer are referred to as other vinyl monomer A). In addition, the usable monomer may be a vinyl monomer other than the monomer having an epoxy group, alkoxyalkyl(meth)acrylate, alkyl(meth)acrylate, and the multifunctional monomer (these are referred to as other vinyl monomer B). The usable monomer includes vinyl aromatic compounds such as styrene, α-methylstyrene, 1- or 2-vinylnaphthalene, monochlorostyrene, dichlorostyrene, bromostyrene, alkyl (meth)acrylates such as methyl (meth)acrylate, ethyl (meth) acrylate, butyl (meth)acrylate, 2-ethylhexyl (meth)acrylate, octyl (meth)acrylate, dodecyl (meth)acrylate, stearyl (meth)acrylate, behenyl (meth) acrylate, alkenes such as ethylene, propylene, butylene, isobutylene, vinyl cyanide compound represented by (meth) acrylonitrile, (meth)acrylamide, alkyl vinyl ether and the like. These may be used individually or in the combination of two or more monomers.

(Preferable Composition and Ratio of Shell Part)

It is preferable that the shell part of the core-shell polymer (B) contains the alkoxy group or the aryloxy group-containing (meth)acrylate ester unit, the epoxy group-containing (meth)acrylate ester unit, and, if necessary, other monomer unit such that the glass transition temperature calculated by FOX formula is less than 25° C.

The shell part of the core-shell polymer (B) is preferably polymerized with one or more monomers selected from the group consisting of alkoxyalkyl (meth)acrylate, methyl acrylate, and ethyl acrylate, a monomer having an epoxy group, and other vinyl monomer B.

The shell part of the core-shell polymer (B) is more preferably polymerized with 5 to 99% by weight of one or more monomers selected from the group consisting of alkoxyalkyl (meth)acrylate, methyl acrylate, and ethyl acrylate, 1 to 50% by weight of a monomer having an epoxy group, and 0 to 50% by weight of other vinyl monomer B. The shell part of the core-shell polymer (B) is more preferably polymerized with 10 to 99% by weight of one or more monomers selected from the group consisting of alkoxyalkyl (meth)acrylate, methyl acrylate, and ethyl acrylate, 1 to 50% by weight of a monomer having an epoxy group, and 0 to 50% by weight of other vinyl monomer B. The shell part of the core-shell polymer (B) is even preferably polymerized with 20 to 99% by weight of one or more monomers selected from the group consisting of alkoxyalkyl (meth)acrylate, methyl acrylate, and ethyl acrylate, 1 to 50% by weight of a monomer having an epoxy group, and 0 to 50% by weight of other vinyl monomer B. The shell part of the core-shell polymer (B) is particularly preferably polymerized with 40 to 99% by weight of one or more monomers selected from the group consisting of alkoxyalkyl (meth)acrylate, methyl acrylate, and ethyl acrylate, 1 to 50% by weight of a monomer having an epoxy group, and 0 to 50% by weight of other vinyl monomer B.

Moreover, the shell part of the core-shell polymer (B) is preferably polymerized with 5 to 99% by weight of 2-alkoxyethyl (meth) acrylate, 1 to 50% by weight of one or more monomers selected from the group consisting of glycidyl (meth)acrylate, allyl glycidyl ether, and glycidyl alkyl (meth) acrylate, and 0 to 50% by weight of other vinyl monomer.

Further, the shell part of the core-shell polymer (B) is preferably polymerized with 5 to 99% by weight of 2-methoxyethyl acrylate, 1 to 50% by weight of one or more monomers selected from the group consisting of glycidyl (meth)acrylate, allyl glycidyl ether, and glycidyl alkyl (meth) acrylate, and 0 to 50% by weight of other vinyl monomer.

(Dispersion State of Core-Shell Polymer)

The core-shell polymer of the present invention is preferably dispersed at the state of primary particles in the cured product of the epoxy resin composition. In the specification, "dispersed at the state of primary particles" means that the core-shell polymers are not aggregated each other, and are dispersed independently. Concretely, the ratio of the particle dispersion (%) calculated with the following numerical formula 2 as set forth below is 50% or more. The ratio of particle dispersion is preferably 75% or more, and more preferably 90% or more in the view of the improvement of the impact-resistant adhesiveness.

Particle dispersion ratio (%)=$(1-(B_1/B_0))\times 100$ (numerical formula 2)

In the sample, the $B_0$ of the number of the each core-shell polymer and the number of the mass of which two or more core-shell polymers are contacted, and the $B_1$ of the mass of which two or more core-shell polymers are contacted are calculated, and the ratio of particle dispersion is calculated with the numerical formula 2. The sample and the observed region in which $B_0$ is at least 10 or more are selected.

(Intermediate Layer (Intermediate Part))

The intermediate layer is contained between the core part and the shell part, and is a polymer polymerized with 30 to 100% by weight of the multifunctional monomer, and 0 to 70% of other vinyl monomer. The intermediate layer is not limited particularly as long as any of effects such as the decrease of the viscosity of the core-shell polymer-containing epoxy resin composition of the present invention, the uniform presence of the shell polymer on the surface of the core-shell polymer, and the improvement of the dispersibility of the core-shell polymer to the epoxy resin is exhibited. The multifunctional monomer is exemplified by divinyl benzene, butanediol di(meth)acrylate, triallyl (iso)cyanurate, allyl (meth)acrylate, diallyl itaconic acid, diallyl phthalic acid and the like.

When the intermediate layer is formed with the multifunctional monomer as a main component, the intermediate polymer layer is graft-polymerized with the shell polymer via one of double bonds of the multifunctional monomer to chemically bond the intermediate layer with the shell polymer, and the intermediate layer is graft-polymerized with the rubber polymer via other double bond of the multifunctional monomer to chemically bond the intermediate layer with the rubber polymer. In addition, the graft efficiency of the shell polymer is increased, the gel content of the whole core-shell polymer is also increased by existing many double bonds on the rubber polymer to easily obtain the three effects of the decrease of the viscosity of the core-shell polymer-containing epoxy resin composition, the uniform presence of the shell polymer on the surface of the core-shell polymer, and the improvement of the dispersibility of the core-shell polymer to the epoxy resin.

(Curing Agent)

When the core-shell polymer-containing epoxy resin composition according to the present invention is thermally cured, a curing agent may be added to the core-shell polymer-containing epoxy resin composition. Examples of the curing agent include an amine-type curing agent such as an aliphatic diamine and an aromatic diamine, an acid anhydride such as hexahydrophthalic anhydride, a novolac-type phenolic resin, an imidazole compound, a tertiary amine, triphenylphosphine, an aliphatic polyamine, an aromatic polyamine, a polyamide, polymercaptan, dicyandiamide, a dibasic acid dihydrazide, an N,N-dialkyl urea derivative, an N,N-dialkyl thiourea derivative, an alkylaminophenol derivative, melamine and guanamine. These curing agents may be used singly, or two or more of them may be used in combination. Preferred examples of the curing agent include an amine-type curing agent, an acid anhydride, an N,N-dialkyl urea derivative, a tertiary amine and an imidazole compound.

The amount of the curing agent to be used is preferably 1 to 80 parts by weight, more preferably 2 to 40 parts by weight, even preferably 3 to 30 parts by weight, particularly preferably 5 to 20 parts by weight, relative to 100 parts by weight of the epoxy resin W. If the amount of the curing agent to be used is less than 1 part by weight, the curability of the resin composition according to the present invention is often deteriorated. If the amount of the curing agent to be used is more than 80 parts by weight, the storage stability of the resin composition according to the present invention is often deteriorated, leading to the difficulty in handling of the resin composition.

When the resin composition according to the present invention is used as a one-part adhesive agent that can be cured by heating, it is preferred to use dicyandiamide as the main component for the curing agent and also use a small amount of at least one compound selected from an N,N'-dialkyl urea derivative, an imidazole compound, a tertiary amine and an amine-type curing agent in combination as a curing accelerator.

Examples of the amine-type curing agent include a linear aliphatic polyamine such as diethylenetriamine, triethylenetetramine, tetraethylenepentamine, dipropylenediamine, diethylaminopropylamine and hexamethylenediamine; a cyclic aliphatic polyamine such as N-aminoethylpiperazine, bis(4-amino-3-methylcyclohexyl)methane, menthenediamine, isophoronediamine, 4,4'-diaminodicyclohexylmethane, 3,9-bis(3-aminopropyl)-2,4,8,10-tetraoxaspiro[5.5]undecane (spiroacetaldiamine), norbomanediamine, tricyclodecanediamine and 1,3-bisaminomethylcyclohexane; an aliaromatic amine such as metaxylenediamine; an aromatic amine such as metaphenylenediamine, 4,4'-diaminodiphenylmethane and 4,4'-diaminodiphenyl sulfone; a polyamine epoxy resin adduct which is a reaction product of an epoxy resin with an excessive amount of a polyamine; a ketimine which is a dehydration reaction product of a polyamine with a ketone such as methyl ethyl ketone and isobutyl methyl ketone; a poly(amido amine) which is produced by the condensation between a dimer of a tall oil fatty acid (dimer acid) with a polyamine; and an amide amine which is produced by the condensation between a tall oil fatty acid with a polyamine.

As another example of the amine-type curing agent, an amine-terminated polyether which contains a polyether main chain and has 1 to 4 (preferably 1.5 to 3) amino groups and/or imino groups on average per molecule can also be used. Examples of a commercially available amine-terminated polyether include Jeffamine D-230, Jeffamine D-400, Jeffamine D-2000, Jeffamine D-4000 and Jeffamine T-5000 which are products manufactured by Huntsman International LLC.

As the amine-type curing agent, an amine-terminated rubber which contains a conjugated diene polymer main chain and has 1 to 4 (more preferably 1.5 to 3) amino groups and/or imino groups on average per molecule can also be used. In this regard, the main chain of the rubber is preferably a polybutadiene homopolymer or copolymer, more preferably a polybutadiene/acrylonitrile copolymer, particularly preferably a polybutadiene/acrylonitrile copolymer having an acrylonitrile monomer content of 5 to 40% by weight (more preferably 10 to 35% by weight, still more preferably 15 to 30% by weight). An example of a commercially available amine-terminated rubber is Hypro 1300X16 ATEN which is a product manufactured by CVC Thermoset Specialties.

When the resin composition according to the present invention is used as a two-part adhesive agent which can be cured at a relatively low temperature around room temperature, it is more preferred to use a poly(amido amine), an amine-terminated polyether and an amine-terminated rubber, and it is particularly preferred to use a combination of a poly(amido amine), an amine-terminated polyether and an amine-terminated rubber, among the above-mentioned amine-type curing agents. Furthermore, when a tertiary amine or an imidazole compound is used in combination with an amine-type curing agent, it becomes possible to improve a curing rate, properties of a cured product, heat resistance and the like.

Examples of the acid anhydride include polysebacic polyanhydride, polyazelaic polyanhydride, succinic anhydride, citraconic anhydride, itaconic anhydride, an alkenyl-substituted succinic anhydride, dodecenylsuccinic anhydride, maleic anhydride, tricarballylic anhydride, nadic anhydride, methylnadic anhydride, a linoleic acid adduct with maleic anhydride, an alkyl-terminated alkylenetetrahydrophthalic anhydride, methyl tetrahydrophthalic anhydride, tetrahydrophthalic anhydride, hexahydrophthalic anhydride, pyromellitic dianhydride, trimellitic anhydride, phthalic anhydride, tetrachlorophthalic anhydride, tetrabrouuphthalic anhydride, dichloromaleic anhydride, chloronadic anhydride, chloredic anhydride and maleic anhydride-grafted polybutadiene. Examples of the novolac-type phenolic resin include phenol novolac, bisphenol A novolac and cresol novolac.

Examples of the N,N-dialkyl urea derivative include p-chlorophenyl-N,N-dimethylurea (Monuron), 3-phenyl-1,1-dimethylurea (Phenuron), 3,4-dichlorophenyl-N, N-dimethylurea (Diuron) and N-(3-chloro-4-methylphenyl)-N',N'-dimethylurea (Chlortoluron).

Examples of the tertiary amine include benzyldimethylamine, 2,4,6-tris(dimethylaminomethyl) phenol, 2-(dimethylaminomethyl)phenol, and 2,4,6-tris(dimethylaminomethyl)phenol incorporated in a poly(p-vinylphenol) matrix, triethylenediamine and N,N-dimethylpiperidine.

Examples of the imidazole compound include a C1-C12 alkylene imidazole, an N-arylimidazole, 2-methylimidazole, 2-ethyl-2-methyl imidazole, N-butylimidazole, 1-cyanoethyl-2-undecylimidazolium-trimellitate, and an addition product of an epoxy resin with imidazole.

When the core-shell polymer-containing epoxy resin composition according to the present invention is photocured, a photopolymerization initiator may be added to the core-shell polymer-containing epoxy resin composition. Examples of the photopolymerization initiator include photocationic polymerization initiators (photo-acid generators) such as an onium salt (e.g., an aromatic sulfonium salt, an aromatic iodonium salt), an aromatic diazonium salt and a metallocene salt with an anion (e.g., hexafluoroantimonate, hexafluorophosphate, tetraphenylborate). These photopolymerization initiators may be used singly, or two or more of them may be used in combination.

(Strengthening Agent)

In the present invention, for the purpose of further improving performance such as toughness, impact resistance, shear adhesiveness and peel adhesiveness, a strengthening agent that is different from the core-shell polymer (B), the rubber-modified epoxy resin or the urethane-modified epoxy resin may be used as required.

The strengthening agent is not limited particularly, and an example of the strengthening agent is a compound which is a so-called blocked isocyanate that is of an elastomer type, contains a urethane group and/or a urea group and has a terminal isocyanate group or terminal isocyanate groups, in which all or some of the terminal isocyanate groups are capped with any one of various blocking agents each having an active hydrogen group. Particularly, the strengthening agent is preferably a compound in which all of the terminal isocyanate groups are capped with a blocking agent. Such a compound can be produced, for example, by reacting an organic polymer having an active-hydrogen-containing group at a terminal thereof with an excessive amount of a polyisocyanate compound to produce a polymer (a urethane prepolymer) having a urethane group and/or a urea group in the main chain thereof and having an isocyanate group or isocyanate groups at a terminal or termini thereof, and subsequently or simultaneously capping all or some of the isocyanate groups with a blocking agent having an active hydrogen group.

Examples of the main chain backbone that constitutes the organic polymer having an active-hydrogen-containing group at a terminal thereof include a polyether-type polymer, a polyacrylic polymer, a polyester-type polymer, a polydiene-type polymer, a saturated hydrocarbon polymer (a polyolefin) and a polythioether-type polymer.

Examples of the active-hydrogen-containing group that constitutes the organic polymer having an active-hydrogen-containing group at a terminal thereof include a hydroxyl group, an amino group, an imino group and a thiol group. Among these groups, a hydroxyl group, an amino group and an imino group are preferred from the viewpoint of availability, and a hydroxyl group is more preferred from the viewpoint of the easiness of handling (viscosity) of the resultant strengthening agent.

Examples of the organic polymer having an active-hydrogen-containing group at a terminal thereof include a polyether-type polymer having a hydroxyl group at a terminal thereof (polyether polyol), a polyether-type polymer having an amino group and/or an imino group at a terminal thereof (polyetheramine), a polyacrylate polyol, polyester polyol, a diene polymer having a hydroxyl group at a terminal thereof (polydiene polyol), a saturated hydrocarbon polymer having a hydroxyl group at a terminal thereof (a polyolefin polyol), a polythiol compound and a polyamine compound. Among these organic polymers, polyether polyol, polyetheramine and a polyacrylate polyol are preferred, because these organic polymers have excellent compatibility with the epoxy resin (A), have relatively low glass transition temperatures and can be cured into cured articles each having excellent impact resistance at lower temperatures. Particularly, polyether polyol and polyetheramine are more preferred because these organic polymers have low viscosities and therefore can be handled satisfactorily, and polyether polyol is particularly preferred.

The organic polymers each having an active-hydrogen-containing group at a terminal thereof, each of which can be used for the preparation of the urethane prepolymer that is a precursor of the strengthening agent, may be used singly, or two or more of them may be used in combination.

The number average molecular weight of the organic polymer having an active-hydrogen-containing group at a terminal thereof is preferably 800 to 7000, more preferably 1500 to 5000, and particularly preferably 2000 to 4000, based on the molecular weight of polystyrene, as measured by GPC.

The polyether-type polymer is substantially a polymer having a repeating unit represented by general formula (1): —$R^1$—O— (wherein $R^1$ represents a linear or branched alkylene group having 1 to 14 carbon atoms), wherein $R^1$ in general formula (1) is preferably a linear or branched alkylene group having 1 to 14 carbon atoms, more preferably 2 to 4 carbon atoms. Specific examples of the repeating unit represented by general formula (1) include —$CH_2O$—, —$CH_2CH_2O$—, —$CH_2CH(CH_3)O$—, —$CH_2CH(C_2H_5)O$—, —$CH_2C(CH_3)_2O$— and —$CH_2CH_2CH_2CH_2O$—. The main chain backbone of the polyether-type polymer may be composed of only a single repeating unit, or may be composed of two or more repeating units. Particularly, a polyether-type polymer which comprises a polymer containing, as the main component, a propylene oxide polymer containing not less than 50% by weight of a propylene oxide repeating unit is preferred, because this type of polyether-type polymer has a relatively low viscosity. Polytetramethylene glycol (PTMG), which is produced by the ring-opening polymerization of tetrahydrofuran, is also preferred, because the polymer has a low Tg and therefore can exhibit excellent properties at lower temperatures and also has high heat resistance.

The polyether polyol is a polyether-type polymer having a hydroxyl group at a terminal thereof, and the polyetheramine is a polyether-type polymer having an amino group or an imino group at a terminal thereof.

As the polyacrylate polyol, a polyol which has a (meth)acrylic acid alkyl ester (co)polymer as a backbone and has a hydroxyl group in the molecule can be mentioned. Particularly, a polyacrylate polyol which is produced by the copolymerization of a hydroxyl group-containing (meth)acrylic acid alkyl ester monomer, such as 2-hydroxyethyl methacrylate, is preferred.

Examples of the polyester polyol include polymers each of which is produced by the polycondensation of a polybasic acid (e.g., maleic acid, fumaric acid, adipic acid, phthalic acid) or an acid anhydride thereof with a polyhydric alcohol (e.g., ethylene glycol, propylene glycol, 1,4-butanediol, 1,6-hexanediol, diethylene glycol, dipropylene glycol, neopentyl glycol) at a temperature ranging from 150 to 270° C. in the presence of an esterification catalyst. In addition, ring-opened polymers of r-caprolactone, valerolactone and the like, and active hydrogen compounds each having at least two active hydrogen atoms, such as polycarbonate diol and castor oil, can also be mentioned as the examples of the polyester polyol.

Examples of the polydiene polyol include polybutadiene polyol, polyisoprene polyol and polychloroprene polyol, and polybutadiene polyol is particularly preferred.

Examples of the polyolefin polyol include polyisobutylene polyol and hydrogenated polybutadiene polyol. Specific examples of the polyisocyanate compound include an aromatic polyisocyanate such as toluene (tolylene) diisocyanate, diphenylmethane diisocyanate and xylylene diisocyanate; and an aliphatic polyisocyanate such as isophorone diisocyanate, hexamethylene diisocyanate, hydrogenated toluene diisocyanate and hydrogenated diphenylmethane diisocyanate. Among these polyisocyanate compounds, an aliphatic polyisocyanate is preferred from the viewpoint of heat resistance, and isophorone diisocyanate and hexamethylene diisocyanate are more preferred from the viewpoint of availability.

Examples of the blocking agent include a primary amine-type blocking agent, a secondary amine-type blocking agent, an oxime-type blocking agent, a lactam-type blocking agent, an active methylene-type blocking agent, an alcohol-type blocking agent, a mercaptan-type blocking agent, an amide-type blocking agent, an imide-type blocking agent, a heterocyclic aromatic compound-type blocking agent, a hydroxy-functional (meth)acrylate-type blocking agent and a phenol-type blocking agent. Among these blocking agents, an oxime-type blocking agent, a lactam-type blocking agent, a hydroxy-functional (meth)acrylate-type blocking agent and a phenol-type blocking agent are preferred, and a hydroxy-functional (meth)acrylate-type blocking agent and a phenol-type blocking agent are more preferred, and a phenol-type blocking agent is still more preferred.

Examples of the primary amine-type blocking agent include butylamine, isopropylamine, dodecylamine, cyclohexylamine, aniline and benzylamine. Examples of the secondary amine-type blocking agent include dibutylamine, diisopropylamine, dicyclohexylamine, diphenylamine, dibenzylamine, morpholine and piperidine. Examples of the oxime-type blocking agent include formaldoxime, acetaldoxime, acetoxime, methyl ethyl ketoxime, diacetyl monoxime and cyclohexane oxime. Examples of the lactam-type blocking agent include ε-caprolactam, δ-valerolactam, γ-butyrolactam and β-butyrolactam. Examples of the active methylene-type blocking agent include ethyl acetoacetate and acetylacetone. Examples of the alcohol-type blocking agent include methanol, ethanol, propanol, isopropanol, butanol, amyl alcohol, cyclohexanol, 1-methoxy-2-propanol, ethylene glycol monomethyl ether, ethylene glycol monoethyl ether, propylene glycol monomethyl ether, benzyl alcohol, methyl glycolate, butyl glycolate, diacetone alcohol, methyl lactate and ethyl lactate. Examples of the mercaptan-type blocking agent include butyl mercaptan, hexyl mercaptan, decyl mercaptan, t-butyl mercaptan, thiophenol, methylthiophenol and ethylthiophenol. Examples of the amide-type blocking agent include acetamide and benzamide. Examples of the imide-type blocking agent include succinimide and maleinimide. Examples of the heterocyclic aromatic compound-type blocking agent include an imidazole compound such as imidazole and 2-ethylimidazole, a pyrrole compound such as pyrrole, 2-methylpyrrole and 3-methylpyrrole, a pyridine compound such as pyridine, 2-methylpyridine and 4-methylpyridine, and a diazabicycloalkene such as diazabicycloundecene and diazabicyclononene.

The hydroxy-functional (meth)acrylate-type blocking agent may be a (meth)acrylate having at least one hydroxyl group. Specific examples of the hydroxy-functional (meth)acrylate-type blocking agent include 2-hydroxyethyl (meth)acrylate, 2-hydroxypropyl (meth)acrylate, 4-hydroxybutyl (meth)acrylate and 2-hydroxybutyl (meth)acrylate.

The phenol-type blocking agent contains at least one phenolic hydroxyl group, i.e., a hydroxyl group that is directly bound to a carbon atom in an aromatic ring. The phenol-type blocking agent may have at least two phenolic hydroxyl groups, but preferably contains only one phenolic hydroxyl group. The phenol-type blocking agent may contain other substituent, and the substituent is preferably one that cannot react with an isocyanate group under capping reaction conditions and is preferably an alkenyl group or an allyl group. Examples of the above-mentioned other substituent include an alkyl group such as a linear alkyl group, a branched alkyl group and a cycloalkyl group; an aromatic group (e.g., a phenyl group, an alkyl-substituted phenyl group, an alkenyl-substituted phenyl group); an aryl-substituted alkyl group; and a phenol-substituted alkyl group. Specific examples of the phenol-type blocking agent include phenol, cresol, xylenol, chlorophenol, ethylphenol, allylphenol (particularly o-allylphenol), resorcinol, catechol, hydroquinone, bisphenol, bisphenol A, bisphenol AP (1,1-bis(4-hydroxylphenyl)-1-phenylethane), bisphenol F, bisphenol K, bisphenol M, tetramethylbiphenol and 2,2'-diallylbisphenol A.

It is preferred that the blocking agent is bound to a terminal of the polymer chain in the urethane prepolymer in such a manner that the terminal to which the blocking agent is bound has no reactive group.

The above-mentioned blocking agents may be used singly, or two or more of them may be used in combination.

The strengthening agent may contain a residue of a cross-linking agent, a residue of a chain extender or both of the residues.

The cross-linking agent preferably has a molecular weight of not more than 750, more preferably 50 to 500, and is a polyol or a polyamine compound each having at least three hydroxyl groups, amino groups and/or imino groups per molecule. The cross-linking agent can impart branches to the strengthening agent, and is therefore useful for increasing the functionality (i.e., the number of capped isocyanate groups per molecule) of the strengthening agent.

The chain extender preferably has a molecular weight of not more than 750, more preferably 50 to 500, and is a polyol or a polyamine compound each having two hydroxyl groups, amino groups and/or imino groups per molecule. The chain extender is useful for increasing the molecular weight of the strengthening agent without increasing the functionality of the strengthening agent.

Specific examples of the cross-linking agent and the chain extender include trimethylolpropane, glycerin, trimethylolethane, ethylene glycol, diethylene glycol, propylene glycol, dipropylene glycol, sucrose, sorbitol, pentaerythritol, ethylenediamine, triethanolamine, monoethanolamine, diethanolamine, piperazine and aminoethylpiperazine. In addition, compounds each having at least two phenolic hydroxyl groups, such as resorcinol, catechol, hydroquinone, bisphenol, bisphenol bisphenol AP (1,1-bis(4-hydroxylphenyl)-1-phenylethane), bisphenol F, bisphenol K, bisphenol M, tetramethylbiphenol and 2,2'-diallylbisphenol A, can also be mentioned as the examples of the cross-linking agent and the chain extender.

The strengthening agent is represented by, for example, general formula (2): A-(NR$^2$—C(=O)—X)$_a$
(wherein "a" pieces of R$^2$s independently represent a hydrocarbon group having 1 to 20 carbon atoms, wherein "a" represents the average number of capped isocyanate groups per molecule and is preferably not less than 1.1, more preferably 1.5 to 8, still more preferably 1.7 to 6, particularly preferably 2 to 4; X represents a residue produced by removing an active hydrogen atom from the blocking agent; and A represents a residue produced by removing a terminal isocyanate group from an isocyanate-terminated prepolymer).

The number average molecular weight of the strengthening agent is preferably 2000 to 40000, more preferably 3000 to 30000, and particularly preferably 4000 to 20000, based on the molecular weight of polystyrene, as measured by GPC. The molecular weight distribution (i.e., the ratio of the weight average molecular weight to the number average molecular weight) of the strengthening agent is preferably 1 to 4, more preferably 1.2 to 3, and particularly preferably 1.5 to 2.5.

When the strengthening agent is used, the amount of the strengthening agent to be used is preferably 1 to 50 parts by weight, more preferably 5 to 30 parts by weight, and particularly preferably 10 to 20 parts by weight, relative to 100 parts by weight of the epoxy resin (A). If the amount is less than 1 part by weight, the effect of improving toughness, impact resistance, adhesiveness and the like is often insufficient. If the amount is more than 50 parts by weight, the elastic modulus of a cured article produced from the composition is often decreased. The strengthening agents may be used singly, or two or more of them may be used in combination.

(Radically Curable Resin)

In the present invention, a radically curable resin having at least two double bonds in the molecule may be used as required. If necessary, a low-molecular-weight compound having a molecular weight of less than 300 and having at least one double bond in the molecule may also be added.

The low-molecular-weight compound can exhibit a function of modulating the viscosity of the composition, the properties of a cured product of the composition and the curing rate of the composition when used in combination with the radically curable resin, and therefore can act as a so-called reactive diluent for the radically curable resin. Furthermore, a radical polymerization initiator may also be added to the resin composition according to the present invention. In this regard, the radical polymerization initiator is preferably one of a latent type which can be activated when the temperature is increased (preferably to about 50° C. to about 150° C.).

Examples of the radically curable resin include an unsaturated polyester resin, polyester (meth)acrylate, epoxy (meth) acrylate, urethane (meth)acrylate, polyether (meth)acrylate and acrylated (meth)acrylate. These radically curable resins may be used singly, or two or more of them may be used in combination. Specific examples of the radically curable resin include those compounds described in a pamphlet of WO 2014/115778. Specific examples of the low-molecular-weight compound and the radical polymerization initiator include those compounds described in a pamphlet of WO 2014/115778.

When the radical polymerization initiator is activated at a temperature different from the curing temperature for the epoxy resin as described in a pamphlet of WO 2010/019539, it becomes possible to partially cure the resin composition through the polymerization selective to the radically curable resin. This partial curing enables the increase in the viscosity of the composition after application of the composition and the improvement in wash-off resistance of the composition. In water-washing shower step in a production line for vehicles and the like, the adhesive agent composition which is not cured yet is often dissolved partially, scattered or deformed by the pressure of the showering water during the water-washing shower step to adversely affect the corrosion resistance of a part of a steel sheet on which the adhesive agent composition is applied or cause the deterioration in stiffness of the steel sheet. The term "wash-off resistance" means the resistance to this problem. The partial curing also enables the impartment of a function of temporarily fixing (temporarily adhering) substrates each other until the completion of the curing of the composition. In this case, it is preferred that the free radical initiator can be activated by heating to 80° C. to 130° C., and more preferably 100° C. to 120° C.

(Filler)

In the present invention, a filler can be used, if necessary. Specific examples of the filler include a reinforcing filler such as dry silica (e.g., hydrophobic fumed silica having a surface treated with polydimethylsiloxane), wet silica, aluminum silicate, magnesium silicate, calcium silicate, dolomite and carbon black; a plate-like filler such as talc and wollastonite; and colloidal calcium carbonate, ground calcium carbonate, calcium oxide, magnesium carbonate, titanium oxide, ferric oxide, a fine aluminum powder, zinc oxide and active zinc oxide. Microballoons having an average particle diameter of not more than 200 µm and a density of not more than 0.2 g/cc can also be used. The particle diameter is preferably about 25 to 150 µm, and the density is preferably about 0.05 to about 0.15 g/cc. Examples of commercially available microballoons include "Dualite" which is a product manufactured by Dualite Corporation, "Expancel" which is a product manufactured by Akzo Nobel Chemicals International B. V., and microspheres which are manufactured by Matsumoto Yushi-Seiyaku Co., Ltd.

(Additives)

In the use of the core-shell polymer-containing epoxy resin composition according to the present invention, a dehydrating agent such as an organic peroxide and calcium oxide, a swelling agent such as an azo-type chemical foaming agent and thermally swellable microballoons, fiber pulp such as aramid-type pulp, an antioxidant agent, a leveling agent, an antifoaming agent, a silane coupling agent, an antistatic agent, a flame retardant agent, a lubricant, a shrinkage diminishing agent, a thermoplastic resin, a desiccant agent, a dispersant, a curing accelerator, a chain transfer agent, a photosensitizer, a reducing agent, a plasticizer, a flexibilizer, a (reactive/non-reactive) liquid rubber, an adhesiveness-imparting agent (including a primer), a dye, a pigment, a stabilizer, an ultraviolet ray absorber, a (reactive/non-reactive) diluent, an organic solvent and the like may be mixed in any one of various steps of the production process.

(Synthesis of Epoxy Resin Composition)

The core-shell polymer-containing epoxy resin composition according to the present invention can be prepared by a method described in a pamphlet of International Publication No. 2005/28546. Specifically, the core-shell polymer-containing epoxy resin composition can be prepared by a method comprising: a first step of mixing an aqueous medium dispersion dispersing the core-shell polymer (B) in an aqueous medium (an aqueous latex containing the core-shell polymer (more specifically, a reaction mixture obtained after the production of the core-shell polymer by emulsion polymerization)) with an organic solvent having the solubility to water at 20° C. of from 5% by weight to 40% by weight, and then further mixing the resulting mixture with excess water to prepare a loose aggregate of the core-shell polymer (also referred to as "core-shell polymer loose aggregates" or "a loosely aggregated core-shell polymer", hereinafter); a second step of separating aggregate of the core-shell polymer from the liquid phase, then further mixing the collected core-shell polymer with an organic solvent to prepare a dispersion containing the core-shell polymer and the organic solvent (also referred to as "an organic solvent dispersion of the core-shell polymer", hereinafter); and a third step of further mixing the dispersion containing the core-shell polymer and the organic solvent with an epoxy resin to distill the organic solvent.

(First Step: Synthesis of Core-Shell Polymer Loose Aggregates)

The first step involves a procedure of mixing an organic solvent preferably having the solubility to water at 20° C. of not less than 5% by weight and not more than 40% by weight (particularly not more than 30% by weight) with an aqueous latex. When an organic solvent as mentioned Above is used, the (below-mentioned) phase separation can occur upon the further addition of water subsequent to the above-mentioned mixing procedure, and consequently core-shell polymer loose aggregates which are enough to be re-dispersed can be produced.

If the solubility of the organic solvent to water is less than 5% by weight, the mixing with the aqueous medium dispersion containing the core-shell polymer becomes often a little difficult to achieve. If the solubility is more than 40% by weight, the (below-mentioned) separation and collection of the core-shell polymer from the liquid phase (an aqueous phase in most cases) becomes often difficult to achieve in the second step.

Examples of the organic solvent having the solubility to water at 20° C. of not less than 5% by weight and not more than 40% by weight include a ketone such as methyl ethyl ketone, an ester such as methyl formate, methyl acetate and ethyl acetate, an ether such as diethyl ether, ethylene glycol diethyl ether and tetrahydropyran, an acetal such as methylal, and an alcohol such as n-butyl alcohol, isobutyl alcohol and sec-butyl alcohol. These organic solvents may be used singly, or two or more of them may be used in combination.

The organic solvent to be used in the first step may be an organic solvent mixture, as long as the organic solvent mixture has a total solubility to water at 20° C. of not less than 5% by weight and not more than 40% by weight. For example, an organic solvent mixture can be mentioned which is composed of a proper combination of at least two organic solvents including at least one poorly water-soluble organic solvent such as a ketone (e.g., methyl propyl ketone, diethyl ketone, methyl isobutyl ketone, ethyl butyl ketone), an ester (e.g., diethyl carbonate, butyl formate, propyl acetate, butyl acetate), an ether (e.g., diisopropyl ether, dibutyl ether), an aliphatic hydrocarbon (e.g., pentane, hexane, heptane, octane), an aromatic hydrocarbon (e.g., benzene, toluene, xylene) and a halogenated hydrocarbon (e.g., methylene chloride, chloroform), and at least one highly water-soluble organic solvent such as a ketone (e.g., acetone, cyclohexanone), an ester (e.g., γ-valerolactone, ethylene glycol monomethyl ether acetate), an ether (e.g., dioxane, ethylene glycol monomethyl ether), an alcohol (e.g., ethanol, isopropyl alcohol, t-butyl alcohol) and tetrahydrofuran.

From the viewpoint of the easiness of the below-mentioned removal of the liquid phase (an aqueous phase in most cases) in the second step, it is preferred that the organic solvent to be used in the first step has a specific gravity smaller than that of water.

The amount of the organic solvent to be mixed with the aqueous latex is preferably not less than 50 parts by weight (particularly not less than 60 parts by weight) and not more than 250 parts by weight (particularly not more than 150 parts by weight) relative to 100 parts by weight of the aqueous latex. If the amount of the organic solvent to be mixed is less than 50 parts by weight, it is often difficult to produce aggregates of the core-shell polymer contained in the aqueous latex. If the amount of the organic solvent to be mixed is more than 300 parts by weight, the amount of water required for the subsequent production of the core-shell polymer loose aggregates is often increased, which leads to the decrease in the production efficiency.

As the procedure of mixing the aqueous latex with the organic solvent, a known procedure can be employed. For example, a conventional apparatus such as a mixing vessel equipped with an impeller may be used, or a static mixer or a line mixer (a type in which a mixing apparatus is installed on a part of a pipe) may be used.

The first step involves a procedure of further adding an excessive amount of water and then mixing the resultant mixture subsequent to the procedure of mixing the aqueous latex with the organic solvent. In this manner, it becomes possible to cause phase separation and produce loose aggregates of the core-shell polymer. In addition, it also becomes possible to elute most electrolyte of a water-soluble emulsifying agent or dispersant, a water-soluble polymerization initiator or a reducing agent, which is used in the preparation of the aqueous latex, into the aqueous phase.

The amount of water to be mixed is preferably not less than 40 parts by weight (particularly not less than 60 parts by weight) and not more than 1000 parts by weight (particularly not more than 700 parts by weight) relative to 100 parts by weight of the organic solvent which is used in the mixing with the aqueous latex. If the amount of water to be mixed is less than 40 parts by weight, it is often difficult to obtain the core-shell polymer in the form of loose aggregates. If the amount of water to be mixed is more than 1000 parts by weight, the concentration of the organic solvent in the aggregated core-shell polymer is decreased. As a result, the prolongation of the time required for re-dispersing the aggregated core-shell polymer in the below-mentioned second step and the like may occur, and thus the dispersibility of the core-shell polymer may be deteriorated.

(Second Step: Synthesis of Core-Shell Polymer Dispersion)

The second step involves a procedure of separating and collecting the loosely aggregated core-shell polymer from the liquid phase to produce a core-shell polymer dope. This procedure enables the separation and removal of water-soluble contaminants including an emulsifying agent from the core-shell polymer.

The aggregated core-shell polymer generally has a property of floating in a liquid phase. Therefore, when a mixing vessel is used in the first step, examples of the method for separating and collecting the aggregated core-shell polymer from the liquid phase include a method comprising discharging the liquid phase (an aqueous phase in most cases) through the bottom of the mixing vessel and a method comprising filtrating the liquid phase using a paper filter, a filter cloth and a metallic screen having a relatively coarse mesh size.

The content of the organic solvent in the loose aggregates of the core-shell polymer is preferably not less than 30% by weight (particularly not less than 35% by weight) and not more than 95% by weight (particularly not more than 90% by weight) relative to the whole weight of the loose aggregates. If the content of the organic solvent is less than 30% by weight, disadvantages may occur, such as a disadvantage that the time required for the (below-mentioned) re-dispersion of the core-shell polymer dope in the organic solvent is prolonged and a disadvantage that irreversible aggregates tend to remain. If the content of the organic solvent is more than 95% by weight, a large quantity of water is dissolved or remains in the organic solvent, which can cause the aggregation of the core-shell polymer in the third step.

In the description of the present invention, the amount of the organic solvent contained in the core-shell polymer aggregates can be determined by accurately weighing the core-shell polymer aggregates, then drying the core-shell polymer aggregates at 120° C. for 15 minutes, and measuring the amount of loss as the amount of the organic solvent contained in the aggregates.

The second step involves a procedure of mixing the core-shell polymer aggregates with an organic solvent. The core-shell polymer is aggregated loosely. Therefore, the core-shell polymer can be re-dispersed readily in the form of primary particles in the organic solvent by mixing the core-shell polymer with the organic solvent.

Examples of the organic solvent to be used in the second step include those organic solvents exemplified as the organic solvents that can be used in the first step. When an organic solvent as mentioned above is used, the organic solvent can be distilled azeotropically with water during the distillation away of the organic solvent in the below-mentioned third step and therefore water contained in the core-shell polymer can be removed. The organic solvent to be used in the second step may be the same as or different from the organic solvent used in the first step.

The amount of the organic solvent to be mixed in the second step is preferably not less than 40 parts by weight (more preferably not less than 200 parts by weight) and not more than 1400 parts by weight (more preferably not more than 1000 parts by weight) relative to 100 parts by weight of the core-shell polymer aggregates. If the amount of the organic solvent to be mixed is less than 40 parts by weight, it becomes difficult to disperse the core-shell polymer in the organic solvent homogeneously, and as the result, the aggregated core-shell polymer may remain in the form of masses, and the viscosity may be increased and therefore the reaction mixture may be difficult to handle. If the amount of the organic solvent to be mixed is more than 1400 parts by weight, a large quantity of energy and a large-scale facility are required in the evaporation/distillation of the organic solvent in the below-mentioned third step, which is economically disadvantageous.

In the present invention, it is preferred to carry out at least one round of a procedure of separating and collecting the aggregated core-shell polymer from the liquid phase, then further mixing the separated and collected aggregated core-shell polymer with an organic solvent having the solubility to water at 20° C. of not less than 5% by weight and not more than 40% by weight, and then further mixing the resultant mixture with an excessive amount of water to produce loose aggregates of the core-shell polymer between the first step and the second step. In this manner, the amount of remaining water-soluble contaminants including an emulsifying agent in the core-shell polymer dope can be reduced.

(Third Step: Synthesis of Epoxy Resin Composition)

The third step involves a procedure of replacing the organic solvent contained in the solution of core-shell polymer in the organic solvent, which is produced in the second step, by the epoxy resin. By carrying out this procedure, it becomes possible to produce a core-shell polymer-containing epoxy resin composition in which the core-shell polymer is dispersed in the form of primary particles. It also becomes possible to azeotropically distill away water remaining in the core-shell polymer aggregates.

The amount of the epoxy resin to be mixed in the third step may be adjusted properly in accordance with the concentration of the core-shell polymer in the finally desired core-shell polymer-containing epoxy resin composition.

As the method for distilling away the organic solvent, a known method can be employed. For example, a method comprising charging a mixture of the organic solvent solution with the epoxy resin into the vessel and then distilling away the organic solvent under heated and pressure-reduced conditions; a method comprising bringing the mixture into contact with a drying gas in a countercurrent manner in the vessel; a continuous method using a thin-film evaporator; a method using an extruder or a continuous mixing vessel each equipped with a devolatilizing mechanism can be mentioned. The conditions including the temperature at which the organic solvent is to be distilled away and the time required for the distillation can be selected properly as long as the quality of the resultant core-shell polymer-containing epoxy resin composition is not deteriorated. The amount of a volatile material remaining in the core-shell polymer-containing epoxy resin composition can also be selected properly within a range that does not cause a problem depending on the intended use of the core-shell polymer-containing epoxy resin composition.

(Core-Shell Polymer-Containing Epoxy Resin Composition)

The resin composition according to the present invention can be used as a one-part resin composition in which all of blend components are previously stored in a blended and hermetically sealed state and which can be applied and then cured upon the application of heat or the irradiation with light. The resin composition can also be used as a two-part or multiple-part resin composition which comprises a solution A containing the epoxy resin (A) as the main component and a separately prepared solution B containing a curing agent, in which the solutions A and B are mixed with each other upon use.

The resin composition contains 100 parts by weight of the epoxy resin (A) and 1 to 100 parts by weight of the core-shell polymer (B), preferably 100 parts by weight of the epoxy resin (A) and 10 to 70 parts by weight of the core-shell polymer (B), and more preferably 100 parts by weight of the epoxy resin (A) and 20 to 50 parts by weight of the core-shell polymer (B).

(Cured Product)

In the present invention, a cured product produced by curing the resin composition is included. In the case of a resin composition in which polymer fine particles are dispersed in the form of primary particles, a cured product in which the polymer fine particles are dispersed homogeneously can be produced readily by curing the resin composition. In this case, since the polymer fine particles are hardly swelled and the viscosity of the resin composition is low, the cured product can be produced with good workability.

(Method for Application)

The resin composition according to the present invention can be applied by any method. The resin composition can be applied at a temperature as low as room temperature, and can also be applied while being heated if necessary.

The resin composition according to the present invention may be extruded in a bead-like, monofilament-like or swirl-like form on a substrate using an application robot, or may be applied employing a mechanical application method using a caulking gun or the like or other manual application means. Alternatively, the composition may be applied onto a substrate by a jet spray method or a streaming method. The resin composition according to the present invention is applied onto one or both of two substrates and the substrates are brought into contact with each other in such a manner that the composition is arranged between the substrates to be bonded each other, and then the resin composition is cured to bond the substrates each other.

When it is intended to use the resin composition according to the present invention as an adhesive agent for vehicle, for the purpose of improving the above-mentioned "wash-off resistance", it is effective to increase the viscosity of the composition. The resin composition according to the present invention is preferred, because the resin composition has high thixotropic properties and therefore tends to have a high viscosity. The viscosity of the highly viscous composition can be adjusted to a value at which the composition can be applied by heating.

Furthermore, for the purpose of improving the "wash-off resistance," it is preferred to add to the composition a polymeric compound having a crystalline melting point around a temperature at which the curable composition according to the present invention is to be applied, as described in a pamphlet of WO 2005/118734. The viscosity of the composition is low (easy to apply) at a temperature at which the composition is to be applied, and is high at a temperature at which the water-washing shower step is to be carried out, and therefore the "wash-off resistance" of the composition is improved. Examples of the polymeric compound having a crystalline melting point around a temperature at which the composition is to be applied include various polyester resins including a crystalline or semi-crystalline polyester polyol.

In addition, as another method for improving the "wash-off resistance" of the composition, a method can be mentioned, in which the resin composition is prepared in the form of a two-part preparation, a curing agent capable of curing at room temperature (e.g., an amine-type curing agent having an amino group or an imino group) is used in a small amount as the curing agent, and a latent curing agent that can exhibit the activity thereof at a higher temperature (e.g., dicyandiamide) is also used in combination, as described in a pamphlet of WO 2006/093949. When at least two types of curing agents having greatly different curing temperatures are used in combination, the partial curing of the composition proceeds immediately after the application of the composition, and the viscosity of the composition becomes high at a time at which the water-washing shower step is carried out, thereby improving the "wash-off resistance" of the composition.

(Substrate to be Adhered)

When it is intended to bond various types of substrates each other using the resin composition according to the present invention, for example, woody materials, metals, plastic materials, and glass materials can be bonded. The bonding of automotive parts to each other is preferred, and the bonding of automotive frames to each other and the bonding of an automotive frame to another automotive part is more preferred. Examples of the substrate include steel materials including cold-rolling steel and hot-dip zinc-coated steel, aluminum materials including aluminum and coated aluminum, and various types of plastic-type substrates including a general-purpose plastic, engineering plastic and a composite material (e.g., CFRP, GFRP).

The resin composition according to the present invention has excellent toughness, and therefore is suitable for the bonding of different base materials having different linear expansion coefficients to each other.

The resin composition according to the present invention can also be used for the bonding of aerospace constituent materials to each other, particularly the bonding of exterior metallic constituent materials to each other.

<Curing Temperature>

The curing temperature for the resin composition according to the present invention is not limited particularly. When the resin composition is used as a one-part resin composition, the curing temperature is preferably 50° C. to 250° C., more preferably 80° C. to 220° C., even preferably 100° C. to 200° C., and particularly preferably 130° C. to 180° C. When the resin composition is used as a two-part resin composition, the curing temperature is not particularly limited, and is preferably 0° C. to 150° C., more preferably 10° C. to 100° C., even preferably 15° C. to 80° C., and particularly preferably 20° C. to 60° C.

When the resin composition according to the present invention is used as an adhesive agent for automobiles, it is preferred to apply the adhesive agent to an automotive member, then apply a coating material onto the automotive member, and then cure the adhesive agent simultaneously with the baking/curing of the coating material, from the viewpoint of the shortening and simplification of the process.

(Use Applications)

The core-shell polymer-containing epoxy resin composition according to the present invention can be used suitably as a molding material, an adhesive agent, an adhesive agent for structures (preferably an adhesive agent for vehicle and aerospace structures and an adhesive agent for wind power-generating structures), a fiber- or filler-reinforced composite material, a sealing material such as a sealing material for display devices and lighting devices including a liquid crystal panel, an OLED lighting devices and an OLED display, an injection material, a material for printed wiring substrates, a solder resist, an interlayer insulating film, a build-up material, an adhesive agent for FPCs, an electrically insulating material including a sealing material for electronic components such as semiconductors and LEDs, a die bonding material, an underfill, a semiconductor packaging material for ACF, ACP, NCF, NCP and the like, a coating material, a filler, an optically molding material, an optical component, ink and toner.

The present application claims the benefit of priority to Japanese Patent Application Number 2013-213403 filed on Oct. 11, 2013. The entire contents of the specification of Japanese Patent Application Number 2013-213403 filed on Oct. 11, 2013 are hereby incorporated by reference.

EXAMPLES

Next, the composition of the present invention will be described in detail with reference to concrete examples, but the present invention is not limited thereto. The measurement method of the Manufacture Example, Example, and Comparative Example is as follows.

(State of Dispersion of Particles)

With 20 parts by weight of each of the below-mentioned core-shell polymer-containing epoxy resin compositions (A-1 to A-14) were mixed 80 parts by weight of a liquid bisphenol A-type epoxy resin "jER (registered trademark) 828EL" (a product name, Mitsubishi Chemical Corporation), 7 parts by weight of dicyandiamide "jER CURE (registered trademark) DICY7" (a product name, Mitsubishi Chemical Corporation) and 1 part by weight of an aromatic dimethylurea "Dyhard (registered trademark) UR300" (a product name, AlzChem GmbH). The resultant mixture was cured at 170° C. for 1 hour, the cured product was cleaved in liquid nitrogen, the freeze-fracture cross-section of the cleaved product was observed with a scanning electron microscope (JEOL Ltd., JSM-6300F) at 20,000-fold magnification, and the state of dispersion of particles in the cross-section was determined by the below-mentioned method employing a particle dispersion ratio (%) as a measure.

(Particle Dispersion Ratio)

Four 5 cm-square areas were selected at random in a 20,000-fold magnification image obtained with the scanning electron microscope, the particle dispersion ratios (%) in the areas were calculated in the above-mentioned manner utilizing numerical formula 2, and an average value of the calculated values was employed. The criteria for the evaluation of the particle dispersion ratios are as follows.

Good: the particle dispersion ratio is not less than 70%.
Unacceptable: the particle dispersion ratio is less than 70%.

(Volume Average Particle Diameters of Rubber Particle and Core-Shell Polymer)

The volume average particle diameters were determined using a particle diameter measurement device (Nikkiso Co., Ltd., Microtrac UPA). A solution prepared by diluting the aqueous latex with deionized water was used as a measurement sample. The measurement was carried out in such a manner that the refractive index of water and the refractive index of each of rubber particles or a core-shell polymer were input, the time of measurement was 600 seconds, and the concentration of the sample was adjusted so that the signal level fell within the range from 0.6 to 0.8.

(Viscosity of Core-Shell Polymer-Containing Epoxy Resin Composition)

For the measurement of the viscosity of a core-shell polymer-containing epoxy resin composition, an epoxy resin composition for viscosity measurement use which was produced by the below-mentioned method was used and the viscosity was measured using a digital viscometer model DV-II+Pro (a product by Brookfield Engineering Laboratories, Inc.). A spindle CPE-41 or CPE-52 was used depending on a viscosity range to be measured, and the viscosity was measured at a measurement temperature of 50° C. and a shear rate 10 "l/s".
(Impact-Resistant Adhesiveness (Wedge Impact Method))

A symmetric wedge test piece was produced in accordance with JIS K 6865, and the test was carried out at 23° C. and/or −30° C. and/or −40° C. under the conditions of an impact speed of 2 m/sec and an impact energy of 50 J.
(Tg of Core Part)

Tg of the core part was calculated by using Tg of the following homopolymer according to the above numerical formula 1.

| Butadiene | −85° C. |
| Dimethylsiloxane | −123° C. |
| γ-methacryloyloxy propylmethyl dimethoxy silane | 43° C. |
| n-butyl acrylate | −54° C. |

(Tg of Shell Part)

Tg of the shell part was calculated by using Tg of the following homopolymer according to the above numerical formula 1.

| Styrene | 100° C. |
| Methyl methacrylate | 105° C. |
| Acrylonitrile | 97° C. |
| Glycidyl methacrylate | 46° C. |
| 2-methoxy ethyl acrylate | −50° C. |
| 4-hydroxy butyl acrylate | −40° C. |
| n-butyl acrylate | −54° C. |
| 2-(2-ethoxyethoxy) ethyl acrylate | −54° C. |
| 2-methoxyethyl methacrylate | 16° C. |
| 2-ethoxyethyl methacrylate | −31° C. |
| Phenoxyethyl acrylate | −22° C. |

Production Example 1; Preparation of
Polybutadiene Rubber Latex (R-1)

Into a pressure-resistant polymerization machine were charged 200 parts by weight of deionized water, 0.03 parts by weight of tripotassium phosphate, 0.002 parts by weight of ethylenediaminetetraacetic acid disodium salt (EDTA), 0.001 parts by weight of ferrous sulfate heptahydrate and 1.55 parts by weight of sodium dodecylbenzenesulfonate (SDBS). The system was fully purged with nitrogen while stirring to remove oxygen from the system, 100 parts by weight of butadiene (Bd) was charged into the system, and the system was heated to 45° C. To the system were charged 0.03 parts by weight of p-menthane hydroperoxide (PHP) and subsequently 0.10 parts by weight of sodium formaldehydesulfoxylate (SFS), and the polymerization was initiated. On each of the times of 3, 5 and 7 hours after the initiation of the polymerization, 0.025 parts by weight of p-menthane hydroperoxide (PHP) was charged. On each of the times of 4, 6 and 8 hours after the initiation of the polymerization, 0.0006 parts by weight of EDTA and 0.003 parts by weight of ferrous sulfate heptahydrate were charged. On the time of 15 hours after the initiation of the polymerization, remaining monomers were devolatilized and removed under a reduced pressure and the polymerization was terminated, thereby producing a polybutadiene rubber latex (R-1) which contained a polybutadiene rubber as the main component. The polybutadiene rubber particles contained in the latex had a volume average particle diameter of 0.08 μm.

Production Example 2; Preparation of
Polybutadiene Rubber Latex (R-2)

Into a pressure-resistant polymerization machine were charged 21 parts by weight of the polybutadiene rubber latex (R-1) produced in Production Example 1 (which contained 7 parts by weight of a polybutadiene rubber), 185 parts by weight of deionized water, 0.03 parts by weight of tripotassium phosphate, 0.002 parts by weight of EDTA and 0.001 parts by weight of ferrous sulfate heptahydrate. The system was fully purged with nitrogen while stirring to remove oxygen from the system, 93 parts by weight of Bd was then charged into the system, and the system was heated to 45° C. To the system were charged 0.02 parts by weight of PHP and subsequently 0.10 parts by weight of SFS, and the polymerization was initiated. During 24 hours from the initiation of the polymerization, 0.025 parts by weight of PHP, 0.0006 parts by weight of EDTA and 0.003 parts by weight of ferrous sulfate heptahydrate were charged at intervals of three hours. On the time of 30 hours after the initiation of the polymerization, remaining monomers were devolatilized and removed under a reduced pressure, and the polymerization was terminated, thereby producing a polybutadiene rubber latex (R-2) which contained a polybutadiene rubber as the main component. The polybutadiene rubber particles contained in the latex had a volume average particle diameter of 0.20 μm.

Production Example 3; Preparation of
Polyorganosiloxane Rubber Latex (R-3)

A mixture of 200 parts by weight of deionized water, 1.0 part by weight of SDBS, 1.0 part by weight of dodecylbenzenesulfonic acid, 97.5 parts by weight of hydroxy-terminated polydimethylsiloxane having an average molecular weight of 2000 and 2.5 parts by weight of γ-methacryloxypropylmethyldimethoxysilane was stirred with a homomixer at 10000 rpm for 5 minutes, and the resultant product was allowed to pass through a high-pressure homogenizer three times under a pressure of 500 bar to prepare a siloxane emulsion. The emulsion was rapidly charged in a lump into a glass reactor equipped with a thermometer, a stirrer, a reflux condenser, a nitrogen inlet and an apparatus for adding auxiliary raw materials including monomers and an emulsifying agent. The reaction was initiated at 30° C. while stirring the system. After 6 hours, the system was cooled to 23° C. and then left for 20 hours, and the pH value of the system was adjusted to 6.8 with sodium hydrogen carbonate, and the polymerization was terminated, thereby producing a latex (R-3) which contained polyorganosiloxane rubber particles. The polyorganosiloxane rubber particles contained in the latex had a volume average particle diameter of 0.28 μm.

Production Example 4; Preparation of Acrylic
Rubber Latex (R-4)

Into a glass reactor equipped with a thermometer, a stirrer, a reflux condenser, a nitrogen inlet and an apparatus for adding monomers and an emulsifying agent were charged 180 parts by weight of deionized water, 0.002 parts by weight of EDTA, 0.001 parts by weight of Fe, 0.04 parts by weight of SFS and 0.5 parts by weight of SDBS. Subsequently, the system was heated to 45° C. while stirring in a nitrogen gas stream. Subsequently, a mixture of 98 parts by weight of n-butyl acrylate (BA), 2 parts by weight of allyl methacrylate (ALMA) and 0.02 parts by weight of cumene hydroperoxide (CHP) was added dropwise to the system over 3 hours. Simultaneously with the addition of the monomer mixture, an aqueous 5 wt % SDS solution prepared using 1 part by weight of SDS was also added continuously over 3 hours. The stirring of the system was continued for 1 hour after the completion of the addition of the monomer mixture to complete the polymerization, thereby producing a latex (R-4) which contained acrylic rubber particles. The acrylic rubber particles contained in the latex had a volume average particle diameter of 0.09 µm.

Production Example 5: Polymerization of Core-Shell Polymer (L-1)

Into a glass reactor equipped with a thermometer, a stirrer, a reflux condenser, a nitrogen inlet and an apparatus for adding monomers were charged 250 parts by weight of the polybutadiene rubber latex (R-1) produced in Production Example 1 (which contained 83 parts by weight of polybutadiene rubber particles) and 65 parts by weight of deionized water. The resultant system was stirred at 60° C. while being purged with nitrogen. To the system were added 0.004 parts by weight of EDTA, 0.001 parts by weight of ferrous sulfate heptahydrate and 0.2 parts by weight of SFS. Subsequently, a mixture of 10 parts by weight of 2-methoxy ethyl acrylate (NEW, 7 parts by weight of glycidyl methacrylate ((NA) and 0.08 parts by weight of CHP was added continuously over 110 minutes. After the completion of the addition, 0.04 parts by weight of CHP was added to the system. The stirring of the system was further continued for 1 hour to complete the polymerization, thereby producing a core-shell polymer-containing aqueous latex (L-1). The polymerization conversion rate of each of the monomer components was not less than 99%. The core-shell polymer contained in the aqueous latex had a volume average particle diameter of 0.10 µm.

Production Examples 6, 7: Polymerization of Core-Shell Polymers (L-2, L-3)

The same procedure as in Production Example 5 was carried out, except that 6 parts by weight of styrene (St), 3 parts by weight of acrylonitrile (AN), 1 part by weight of methyl methacrylate (MMA) and 7 parts by weight of GMA or 16.2 parts by weight of MEA and 0.8 parts by weight of allyl methacrylate (ALMA) were used in place of 10 parts by weight of MEA and 7 parts by weight of GMA. In this manner, core-shell polymer-containing aqueous latexes (L-2) and (L-3) were produced, respectively. The polymerization conversion rate of each of the monomer components was not less than 99%. Each of the core-shell polymers respectively contained in the aqueous latexes had a volume average particle diameter of 0.10 µm.

Production Example 8: Polymerization of Core-Shell Polymer (L-4)

Into a glass reactor equipped with a thermometer, a stirrer, a reflux condenser, a nitrogen inlet and an apparatus for adding monomers were charged 183 parts by weight of the polybutadiene rubber latex (R-1) produced in Production Example 1 (which contained 61 parts by weight of polybutadiene rubber particles), 78 parts by weight of the polybutadiene rubber latex (R-2) produced in Production Example 2 (which contained 26 parts by weight of polybutadiene rubber particles) and 54 parts by weight of deionized water. The system was stirred at 60° C. while being purged with nitrogen. To the system were added 0.004 parts by weight of EDTA, 0.001 parts by weight of ferrous sulfate heptahydrate and 0.2 parts by weight of SFS. Subsequently, a mixture of 10 parts by weight of MEA, 3 parts by weight of GMA and 0.04 parts by weight of CHP was continuously added over 85 minutes. After the completion of the addition, 0.065 parts by weight of CHP was added, and the stirring was further continued for 1 hour to complete the polymerization, thereby producing a core-shell polymer-containing aqueous latex (L-4). The polymerization conversion rate of each of the monomer components was not less than 99%. The core-shell polymer contained in the aqueous latex had a volume average particle diameter of 0.19 µm.

Production Examples 9 to 13: Polymerization of Core-Shell Polymers (L-5 to L-9)

The same procedure as in Production Example 8 was carried out, except that 9 parts by weight of MEA, 2 parts by weight of MMA and 2 parts by weight of GMA, or 7 parts by weight of St, 3 parts by weight of AN and 3 parts by weight of GMA, or 13 parts by weight of WA, or 13 parts by weight of MEA, or 12 parts by weight of MEA and 1 part by weight of 4-hydroxylbutyl acrylate (4HBA) were used in place of 10 parts by weight of MEA and 3 parts by weight of GMA. In this manner, core-shell polymer-containing aqueous latexes (L-5) to (L-9) were produced, respectively. The polymerization conversion rate of each of the monomer components in each of the aqueous latexes was not less than 99%. Each of the core-shell polymers respectively contained in the aqueous latexes had a volume average particle diameter of 0.19 µm.

Production Example 14: Polymerization of Core-Shell Polymer (L-10)

Into a glass reactor equipped with a thermometer, a stirrer, a reflux condenser, a nitrogen inlet and an apparatus for adding monomers were charged 183 parts by weight of the polybutadiene rubber latex (R-1) produced in Production Example 1 (which contained 61 parts by weight of polybutadiene rubber particles), 78 parts by weight of the polybutadiene rubber latex (R-2) produced in Production Example 2 (which contained 26 parts by weight of polybutadiene rubber particles) and 54 parts by weight of deionized water. The system was stirred at 60° C. while being purged with nitrogen. To the system were added 0.004 parts by weight of EDTA, 0.001 parts by weight of ferrous sulfate heptahydrate and 0.2 parts by weight of SFS. To the system were added, as intermediate layer components, 2 parts by weight of triallyl isocyanurate (TAIC) and 0.07 parts by weight of CHP. Subsequently, the system was stirred for 60 minutes. Subsequently, a mixture of 11.5 parts by weight of MEA, 0.5 parts by weight of BA, 1 part by weight of (VIA and 0.04 parts by weight of CHP was added continuously over 85 minutes as a shell part component. After the completion of the addition, 0.065 parts by weight of CHP was added to the system, and the stirring was further continued for 1 hour to complete the polymerization, thereby producing a core-shell polymer-containing aqueous latex (L-10). The polymerization conversion rate of each of the monomer components was not less than 99%. The core-shell polymer contained in the aqueous latex had a volume average particle diameter of 0.19 μm.

Production Example 15: Polymerization of Core-Shell Polymer (L-11)

Into a glass reactor equipped with a thermometer, a stirrer, a reflux condenser, a nitrogen inlet and an apparatus for adding monomers were charged 250 parts by weight of the polyorganosiloxane rubber latex (R-3) produced in Production Example 3 (which contained 83 parts by weight of polyorganosiloxane rubber particles) and 65 parts by weight of deionized water. The system was stirred at 60° C. while being purged with nitrogen. Subsequently, 0.004 parts by weight of EDTA, 0.001 parts by weight of ferrous sulfate heptahydrate and 0.2 parts by weight of SFS were added, then 2 parts by weight of TAIC and 0.07 parts by weight of CHP were further added, and the resultant product was stirred for 60 minutes. Subsequently, a mixture of 11 parts by weight of MEA, 6 parts by weight of CIA and 0.05 parts by weight of CHP was continuously added over 110 minutes. After the completion of the addition, 0.065 parts by weight of CHP was added, and the stirring was further continued for 1 hour to complete the polymerization, thereby producing a core-shell polymer-containing aqueous latex (L-11). The polymerization conversion rate of each of the monomer components was not less than 99%. The core-shell polymer contained in the aqueous latex had a volume average particle diameter of 0.30 μm.

Production Example 16: Polymerization of Core-Shell Polymer (L-12)

The same procedure as in Production Example 15 was carried out, except that 7 parts by weight of styrene (St), 4 parts by weight of acrylonitrile (AN), and 6 parts by weight of GMA were used in place of 11 parts by weight of MEA and 6 parts by weight of GMA. In this manner, core-shell polymer-containing aqueous latexes (L-12) was produced. The polymerization conversion rate of each of the monomer components was not less than 99%. The core-shell polymer contained in the aqueous latex had a volume average particle diameter of 0.30 μm.

Production Example 17: Polymerization of Core-Shell Polymer (L-13)

Into a glass reactor equipped with a thermometer, a stirrer, a reflux condenser, a nitrogen inlet and an apparatus for adding monomers were charged 250 parts by weight of the acrylic rubber latex (R-4) produced in Production Example 4 (which contained 83 parts by weight of acrylic rubber particles), and 65 parts by weight of deionized water. The system was stirred at 60° C. while being purged with nitrogen. To the system were added 0.004 parts by weight of EDTA, 0.001 parts by weight of ferrous sulfate heptahydrate and 0.2 parts by weight of SFS. Subsequently, a mixture of 11 parts by weight of MEA, 6 parts by weight of GMA and 0.08 parts by weight of CHP was continuously added over 110 minutes. After the completion of the addition, 0.04 parts by weight of CHP was added, and the stirring was further continued for 1 hour to complete the polymerization, thereby producing a core-shell polymer-containing aqueous latex (L-13). The polymerization conversion rate of the monomer components was not less than 99%. The core-shell polymer contained in the aqueous latex had a volume average particle diameter of 0.11 μm.

Production Example 18: Polymerization of Core-Shell Polymer (L-14)

The same procedure as in Production Example 17 was carried out, except that 7 parts by weight of styrene (St), 4 parts by weight of acrylonitrile (AN), and 6 parts by weight of GMA were used in place of 11 parts by weight of MEA and 6 parts by weight of CMA. In this manner, core-shell polymer-containing aqueous latex (L-14) was produced. The polymerization conversion rate of the monomer components was not less than 99%. The core-shell polymers contained in the aqueous latex had a volume average particle diameter of 0.11 μm.

Production Example 19: Production of Epoxy Resin Compositions (A-1 to A-14)

Into a 1-L mixing vessel having a temperature of 30° C. was charged 126 parts by weight of methyl ethyl ketone (MEK), and was subsequently charged 126 parts by weight of the core-shell polymer-containing aqueous latex (L-1) produced in Production Example 5 while stirring. The system was mixed homogeneously, and then 200 parts by weight of water was charged at a supply rate of 80 parts by weight/min. After the completion of the supply, the stirring was terminated rapidly, thereby producing a slurry solution containing floating aggregates. Subsequently, the aggregates were left, and 350 parts by weight of the liquid phase was discharged through a discharge port located at the bottom of the vessel. The resultant aggregates were further mixed with 150 parts by weight of MEK, thereby producing a dispersion in which a core-shell polymer was dispersed. A liquid bisphenol A-type epoxy resin "jER (registered trademark) 828EL" (a product name, Mitsubishi Chemical Corporation, epoxy equivalent: 184 to 194) was added to the dispersion in such a manner that the (core-shell polymer)/(epoxy resin) content ratio became 25/75, followed by mixing, and then the organic solvent was distilled away under reduced pressure, thereby producing an epoxy resin composition (A-1). The same procedure as mentioned above was carried out, except that each of the core-shell polymer-containing aqueous latexes (L-2 to L-14) produced in Production Examples 6 to 18 was used, thereby producing epoxy resin compositions (A-2 to A-14), respectively.

Production Example 20: Production of Epoxy Resin Compositions for Viscosity Measurement Use Into a 1-L mixing vessel which had a temperature of 30° C. and into which 126 parts by weight of MEK had been charged was charged 126 parts by weight of each of the core-shell polymer-containing aqueous latexes (L-1 to L-14) produced in Production Examples 5 to 18 while stirring. After the system was mixed homogeneously, 200 parts by weight of water was charged at a supply rate of 80 parts by weight/min. After the completion of the supply, the stirring was terminated rapidly, thereby producing a slurry solution containing floating aggregates. Subsequently, the aggregates were left, and 350 parts by weight of the liquid phase was discharged through a discharge port located at the bottom of the vessel. The resultant aggregates were further mixed with 150 parts by weight of MEK, thereby producing a dispersion in which a core-shell polymer was dispersed. The above-mentioned jER (registered trademark) 828EL was added to the dispersion in such a manner that the (core-shell polymer)/(epoxy resin) content ratio became 25/75 or 45/55, followed by mixing, and then the organic solvent was distilled away under reduced pressure, thereby producing epoxy resin compositions for viscosity measurement use, respectively.

The components of the epoxy resin compositions (A-1 to A-14) produced in Production Example 19 are shown in Table 1.

istered trademark) 280" (a product name, Cabot Corporation), 15 parts by weight of calcium carbonate "Whiton SB" (a product name, Shiraishi Calcium Co., Ltd.) and 5 parts by weight of calcium oxide "CML#31" (a product name, Ohmi Chemical Industry Co., Ltd.). The resultant mixture was mixed with an automatic revolving mixer (Thinky Corporation, AR-250) and then further mixed and stirred with a triple roll mill, thereby producing a core-shell polymer-containing adhesive composition (B-1).

A symmetric wedge test piece was produced in accordance with JIS K 6865 using the core-shell polymer-containing adhesive composition (B-1) and two cold-rolling steel sheets SPCC-SD each having a thickness of 0.8 mm, a width of 20 mm and a length of 90 mm. The adhesive thickness was adjusted to 0.25 mm, and the curing of the core-shell polymer-containing adhesive composition was carried out by heating at 170° C. for 1 hour.

Examples 2 to 6

The same procedure as in Example 1 was carried out, except that each of the epoxy resin compositions (A-4), (A-5), (A-10), (A-11) and (A-13) was used in place of the

TABLE 1

| | | Constitution of core-shell polymer | | | | | | | | | | | | | | |
|---|---|---|---|---|---|---|---|---|---|---|---|---|---|---|---|---|
| Epoxy resin composition | Used aqueous latex | Core part (parts by weight) | | | | Intermediate part (parts by weight) | Shell part (parts by weight) | | | | | | | | Core part Tg* (° C.) | Shell part Tg* (° C.) |
| | | R-1 | R-2 | R-3 | R-4 | TAIC | St | MMA | AN | MEA | BA | 4HBA | GMA | ALMA | | |
| A-1 | L-1 | 83 | | | | | | | | 10 | | 7 | | | −85 | −18 |
| A-2 | L-2 | 83 | | | | | 6 | 1 | 3 | | | 7 | | | −85 | 75 |
| A-3 | L-3 | 83 | | | | | | | | 16.2 | | | | 0.8 | −85 | −50 |
| A-4 | L-4 | 61 | 26 | | | | | | | 10 | | 3 | | | −85 | −33 |
| A-5 | L-5 | 61 | 26 | | | | | 2 | | 9 | | 2 | | | −85 | −23 |
| A-6 | L-6 | 61 | 26 | | | | 7 | | 3 | | | 3 | | | −85 | 85 |
| A-7 | L-7 | 61 | 26 | | | | | 13 | | | | | | | −85 | 105 |
| A-8 | L-8 | 61 | 26 | | | | | | | 13 | | | | | −85 | −50 |
| A-9 | L-9 | 61 | 26 | | | | | | | 12 | 1 | | | | −85 | −49 |
| A-10 | L-10 | 61 | 26 | | | 2 | | | | 11.5 | 0.5 | 1 | | | −85 | −45 |
| A-11 | L-11 | | | 83 | | 2 | | | | 11 | | 6 | | | −121 | −23 |
| A-12 | L-12 | | | 83 | | 2 | 7 | 4 | | | | 6 | | | −121 | 78 |
| A-13 | L-13 | | | | 83 | | | | | 11 | | 6 | | | −54 | −23 |
| A-14 | L-14 | | | | 83 | | 7 | 4 | | | | 6 | | | −54 | 78 |

*ALMA is not contained in the calculation of shell part Tg

Example 1

To 120 parts by weight of the epoxy resin composition (A-1) produced in Production Example 19 (which contained 30 parts by weight of the core-shell polymer) were added 10 parts by weight of the above-mentioned jER (registered trademark) 828EL, 10 parts by weight of "Cardura (registered trademark) E10P" (a product name, Momentive Specialty Chemicals Inc.) as a reactive diluent (a glycidyl ester compound), 7 parts by weight of dicyandiamide "jER CURE (registered trademark) DICY7" (a product name, Mitsubishi Chemical Corporation) as a curing agent, 1 part by weight of an aromatic dimethylurea "Dyhard (registered trademark) UR300" (a product name, AlzChem GmbH) as a curing accelerator, 3 parts by weight of silica "CAB-O-SIL (registered trademark) TS720" (a product name, Cabot Corporation), 0.3 parts by weight of carbon black "Monarch (regepoxy resin composition (A-1). In this manner, core-shell polymer-containing adhesive compositions (B-4), (B-5), (B-10), (B-11) and (B-13) were produced, respectively, and symmetric wedge test pieces were produced. These pieces were used as Examples 2 to 6.

Comparative Examples 1 to 8

The same procedure as in Example 1 was carried out, except that each of the epoxy resin compositions (A-2), (A-3), (A-6), (A-7), (A-8), (A-12) and (A-14) was used in place of the epoxy resin composition (A-1). In this manner, core-shell polymer-containing adhesive compositions (B-2), (B-3), (B-6), (B-7), (B-8), (B-9), (B-12) and (B-14) were produced, respectively, and symmetric wedge test pieces were produced.

These pieces were used as Comparative Examples 1 to 8. The results of each of physical measurements of Examples 1 to 6 and Comparative Examples 1 to 8 are shown in Table 2.

TABLE 2

| | Epoxy resin composition | Viscosity of epoxy resin composition* (mPa * s @50° C., shear rate 10 [1/s]) 25 wt % | 45 wt % | Particle dispersion state | Impact-resistant adhesiveness (kN/m) wedge impact method 23° C. | −40° C. |
|---|---|---|---|---|---|---|
| Example 1 | A-1 | 4500 | | Good | 35 | 6 |
| Comparative Example 1 | A-2 | 6000 | | Good | 28 | 4 |
| Comparative Example 2 | A-3 | 4600 | | Unaccepatable | 20 | 0 |
| Example 2 | A-4 | | 25400 | Good | 34 | 16 |
| Example 3 | A-5 | | 27000 | Good | 32 | 18 |
| Comparative Example 3 | A-6 | | 50000 or more | Good | 31 | 5 |
| Comparative Example 4 | A-7 | | 50000 or more | Unacceptable | 18 | 0 |
| Comparative Example 5 | A-8 | | 27000 | Unacceptable | 29 | 0 |
| Comparative Example 6 | A-9 | | 50000 or more | Good | 30 | 3 |
| Example 4 | A-10 | | 20000 | Good | 33 | 21 |
| Example 5 | A-11 | 2600 | | Good | 5 | — |
| Comparative Example 7 | A-12 | 3000 | | Good | 0 | — |
| Example 6 | A-13 | 17500 | | Good | 4 | — |
| Comparative Example 8 | A-14 | 50000 | | Good | 0 | — |

*This is viscosity when the concentration of the core-shell polymer is 25 wt % or 45 wt %

(Case 1—Polybutadiene Rubber Core; Example 1, Comparative Examples 1 and 2)

As shown in Table 2, it was found that the epoxy resin composition of Comparative Example 1 had a higher viscosity and lower impact-resistant adhesiveness at both of 23° C. and −40° C. compared with those of the epoxy resin composition of Example 1. It was found that, although the viscosity of the epoxy resin composition of Comparative Example 2 was almost the same as that of the epoxy resin composition of Example 1, the epoxy resin composition of Comparative Example 2 had lower impact-resistant adhesiveness at both of 23° C. and −40° C. compared with that of the epoxy resin composition of Example 1 and particularly the epoxy resin composition of Comparative Example 2 did not show strength at all at −40° C. In addition, in Comparative Example 2, it was also found that the core-shell polymer was not dispersed in the form of primary particles upon curing because no epoxy group-containing monomer was used in the shell part in the core-shell polymer. In contrast, in Example 1, it was found that the viscosity of the epoxy resin composition was lower and the impact-resistant adhesiveness of the epoxy resin composition at both of 23° C. and −40° C. was higher compared with those in Comparative Examples 1 and 2.

(Case 2—Polybutadiene Rubber Core; Examples 2 to 4, Comparative Examples 3 to 6)

As shown in Table 2, in Comparative Example 3, it was found that, the viscosity of the epoxy resin composition was higher and the impact-resistant adhesiveness at both of 23° C. and −40° C. was lower compared with those in Examples 2 to 4. In Comparative Example 4, it was found that the viscosity of the epoxy resin composition was higher and the impact-resistant adhesiveness at both of 23° C. and −40° C. was lower compared with those in Examples 2 to 4 and particularly the epoxy resin composition did not show strength at all at −40° C., and it was also found that the core-shell polymer was not dispersed in the form of primary particles upon curing because no epoxy-group-containing monomer was used in the shell part in the core-shell polymer. In Comparative Example 5, it was found that the viscosity of the epoxy resin composition was almost the same as those in Examples 2 to 4, but the impact-resistant adhesiveness of the epoxy resin composition at 23° C. was slightly lower compared with those in Examples 2 to 4, and the epoxy resin composition did not show impact-resistant adhesion strength at all at −40° C., and it was also found that the core-shell polymer was not dispersed in the form of primary particles upon curing because no epoxy-group-containing monomer was used in the shell part in the core-shell polymer. In Comparative Example 6, it was found that the viscosity of the epoxy resin was higher and the impact-resistant adhesiveness of the epoxy resin composition at both of 23° C. and −40° C. was lower compared with those in Examples 2 to 4. In contrast, in each of Examples 2 to 4, it was found that the viscosity of the epoxy resin composition was lower and the impact-resistant adhesiveness of the epoxy resin composition at both of 23° C. and −40° C. was higher compared with those in Comparative Examples 3 to 6.

(Case—Polyorganosiloxane Rubber Core; Example 5, Comparative Example 7)

As shown in Table 2, in Comparative Example 7, it was found that the viscosity of the epoxy resin composition was higher compared with that in Example 5 and the epoxy resin composition did not show impact-resistant adhesion strength at all at 23° C. In contrast, in Example 5, it was found that the viscosity of the epoxy resin composition was lower and the impact-resistant adhesiveness of the epoxy resin composition at 23° C. was higher compared with those in Comparative Example 7.

(Case—Acrylic Rubber Core; Example 6, Comparative Example 8)

As shown in Table 2, it was found that the epoxy resin composition of Comparative Example 8 had a higher viscosity compared with that of the epoxy resin composition of Example 6. It was found that the epoxy resin composition of Comparative Example 8 did not show impact-resistant adhesiveness at 23° C. at all compared with that of the epoxy resin composition of Example 6. In contrast, in Example 6, it was found that the viscosity of the epoxy resin composition was lower and the impact-resistant adhesiveness of the epoxy resin composition at 23° C. was higher compared with that in Comparative Example 8.

Production Example 21: Polymerization of Core-Shell Polymer (L-15)

Into a glass reactor equipped with a thermometer, a stirrer, a reflux condenser, a nitrogen inlet and an apparatus for adding monomers were charged 90 parts by weight of the polybutadiene rubber latex (R-1) produced in Production Example 1 (which contained 30 parts by weight of polybutadiene rubber particles), and 180 parts by weight of the polybutadiene rubber latex (R-2) produced in Production Example 2 (which contained 60 parts by weight of polybutadiene rubber particles), and 65 parts by weight of deionized water. The system was stirred at 60° C. while being purged with nitrogen. To the system were added 0.004 parts by weight of EDTA, 0.001 parts by weight of ferrous sulfate heptahydrate and 0.2 parts by weight of SFS. Subsequently, a mixture of 8.5 parts by weight of MEA, 1.5 parts by weight of GMA and 0.05 parts by weight of CHP was continuously added over 60 minutes. After the completion of the addition, 0.04 parts by weight of CHP was added, and the stirring was further continued for 1 hour to complete the polymerization, thereby producing a core-shell polymer-containing aqueous latex (L-15). The polymerization conversion rate of the monomer components was not less than 99%. The core-shell polymer contained in the aqueous latex had a volume average particle diameter of 0.19 μm.

Production Examples 22 to 26: Polymerization of Core-Shell Polymers (L-16 to L-20)

The same procedure as in Production Example 21 was carried out, except that 8.5 parts by weight of 2-(2-ethoxyethoxy)ethyl acrylate (EEEA), or 8.5 parts by weight of 2-methoxyethyl methacrylate (MEMA), or 8.5 parts by weight of 2-ethoxyethyl methacrylate (EEMA), or 8.5 parts by weight of phenoxyethyl acrylate (PEA), or 8.5 parts by weight of MMA was used in place of 8.5 parts by weight of MEA. In this manner, core-shell polymer-containing aqueous latexes (L-16) to (L-20) were produced, respectively. The polymerization conversion rate of each of the monomer components in each of the aqueous latexes was not less than 99%. The core-shell polymer contained in each of the aqueous latexes had a volume average particle diameter of 0.19 μm.

Manufacture Example 27: Preparation of Epoxy Resin Composition (A-15 to A-20)

Into a 1 L mixing tank at 30° C., 126 parts by weight of methyl ethyl ketone (MEK) was introduced, successively 126 parts by weight of the aqueous latex (L-15) of core-shell polymers obtained in Production Example 21 was added while being stirred. After uniformly mixing, 200 parts by weight of water was added at a feeding speed of 80 parts by weight/min. After the water feeding was completed, stirring was quickly stopped. At the time, a slurry liquid containing buoyant agglomerates was obtained. Next, 350 parts by weight of the aqueous phase was discharged through a discharge port located of lower of the tank, while leaving the agglomerates. The obtained agglomerates were mixed uniformly with 150 parts by weight of MEK to obtain a dispersion in which the core-shell polymers were uniformly dispersed. The liquid bisphenol A epoxy resin "jER (registered trademark) 828EL" was added to the dispersion such that the weight ratio of core-shell polymer/epoxy resin is 40/60 to mix these, the organic solvent was distilled under reduced pressure to prepare an epoxy resin composition (A-15). In addition, each of the epoxy resin compositions (A-16 to A-20) was prepared by using each of the aqueous latexes (L-16) to (L-20) of core-shell polymers obtained in Manufacture Examples 22 to 26.

The components of the epoxy resin compositions (A-16 to A-20) obtained in Manufacture Example 27 are shown in Table 3.

TABLE 3

| | | Constitution of core-shell polymer | | | | | | | | | | | | |
|---|---|---|---|---|---|---|---|---|---|---|---|---|---|---|
| Epoxy resin composition | Used aqueous latex | Core part (parts by weight) | | Shell part (parts by weight) | | | | | | | | | Core part Tg (° C.) | Shell part Tg (° C.) |
| | | R-1 | R-2 | St | MMA | AN | MEA | MEMA | EEMA | EEEA | PEA | GMA | | |
| A-15 | L-15 | 30 | 60 | | | | 8.5 | | | | | 1.5 | −85 | −37.3 |
| A-16 | L-16 | 30 | 60 | | | | | | | 8.5 | | 1.5 | −85 | −41.1 |
| A-17 | L-17 | 30 | 60 | | | | | 8.5 | | | | 1.5 | −85 | 23.5 |
| A-18 | L-18 | 30 | 60 | | | | | | 8.5 | | | 1.5 | −85 | −19.4 |
| A-19 | L-19 | 30 | 60 | | | | | | | | 8.5 | 1.5 | −85 | −11.0 |
| A-20 | L-20 | 30 | 60 | 8.5 | | | | | | | | 1.5 | −85 | 100.2 |

Examples 7 to 11

The same procedure as in Example 1 was carried out, except that 75 parts by weight of each of the epoxy resin compositions (A-15) to (A-19) (each contained 30 parts by weight of core-shell polymers) and 55 parts by weight of the jER (registered trademark) 828EL was used in place of 120 parts by weight of the epoxy resin composition (A-1) (containing 30 parts by weight of core-shell polymers) and 10 parts by weight of the jER (registered trademark) 828 EL. In this manner, core-shell polymer-containing adhesive compositions (B-15) to (B-19) were produced, respectively, and symmetric wedge test pieces were produced. These pieces were used as Examples 7 to 11.

Comparative Example 9

The same procedure as in Example 1 was carried out, except that 75 parts by weight of the epoxy resin composition (A-20) (each contained 30 parts by weight of core-shell polymers) and 55 parts by weight of the jER (registered trademark) 828EL was used in place of 120 parts by weight of the epoxy resin composition (A-1) (containing 30 parts by weight of core-shell polymers) and 10 parts by weight of the jER (registered trademark) 828 EL. In this manner, core-shell polymer-containing adhesive composition (B-20) was produced, and symmetric wedge test pieces were produced. These pieces were used as Comparative Example 9.

The results of each of the impact-resistant adhesiveness at 23° C. of Examples 7 to 11 and Comparative Example 9 are shown in Table 4.

TABLE 4

|  | Composition of shell part the numerical represents the amount used | Shell part Tg (° C.) | Impact-resistant adhesiveness (kN/m) 23° C. |
|---|---|---|---|
| Example 7 | MEA$^{8.5}$/GMA$^{1.5}$ | −37.3 | 28.7 |
| Example 8 | MEMA$^{8.5}$/GMA$^{1.5}$ | 23.5 | 25.1 |
| Example 9 | EEMA$^{8.5}$/GMA$^{1.5}$ | −19.4 | 26.3 |
| Example 10 | EEEA$^{8.5}$/GMA$^{1.5}$ | −41.1 | 28.2 |
| Example 11 | PEA$^{8.5}$/GMA$^{1.5}$ | −11.0 | 27.4 |
| Comaparative Example 9 | MMA$^{8.5}$/GMA$^{1.5}$ | 100.2 | 23.8 |

*Core-shell polymer containing epoxy resin composition contains 40% by weight of core-shell polymer and 60% by weight of liquid bisphenol A epoxy resin Example 7 showed that the impact-resistant adhesiveness at −30° C. was 21.1 kN/m and the viscosity at 50° C. was 9200 mPa·s. Example 8 showed that the impact-resistant adhesiveness at −30° C. was 19.9 kN/m and the viscosity at 50° C. was 9800 mPa·s. Example 9 showed that the viscosity at 50° C. was 13300 mPa·s. Example 11 showed that the impact-resistant adhesiveness at −30° C. was 24.4 kN/m.

Thus, Comparative Example 9 showed lower impact-resistant adhesiveness than those of Examples 7 to 11. On the contrary, Examples 7 to 11 showed higher impact-resistant adhesiveness at 23° C. than that of Comparative Example 9. According to results of Examples 7, 8, 11 and the like, the present invention showed excellent impact-resistant adhesiveness at −30° C. in particularly instant of using acrylic acid ester to the shell part. Further, according to results of Examples 7 and 8, the present invention showed excellent lower viscosity in particularly instant of using the alkoxy group-containing acrylate ester to the shell part.

The invention claimed is:

1. A core-shell polymer-containing epoxy resin composition, comprising:
   an epoxy resin; and
   from 1 to 100 parts by weight of a core-shell polymer with respect to 100 parts by weight of the epoxy resin,
   wherein
   the core-shell polymer has a volume average particle diameter of from 0.01 to 1 μm,
   a core part of the core-shell polymer has a glass transition temperature of less than 0° C.,
   a shell part of the core-shell polymer has a glass transition temperature of less than 25° C.,
   wherein the shell part of the core-shell polymer is obtained by polymerizing from 5 to 99% by weight of at least one monomer selected from the group consisting of alkoxy alkyl (meth) acrylate, methyl acrylate, and ethyl acrylate, from 1 to 50% by weight of the monomer comprising an epoxy group, wherein the monomer comprising an epoxy group is at least one monomer selected from the group consisting of glycidyl (meth)acrylate, allyl glycidyl ether, and glycidyl alkyl (meth) acrylate, and from 0 to 50% by weight of other vinyl monomer, and
   wherein the epoxy resin comprises at least one polyepoxide selected from the group consisting of a polyglycidyl ether, a polyglycidylamine compound, an alicyclic epoxy resin, an addition reaction product of polyhydric alcohols and epichlorohydrin, a halogenated epoxy resin, and a homopolymer or copolymer of monomers containing unsaturated monoepoxide.

2. The core-shell polymer-containing epoxy resin composition according to claim 1,
   wherein the core part of the core-shell polymer comprises a rubber elastic body composed of 50% by weight or more of at least one of a diene monomer and a (meth)acrylate ester monomer and from 0% by weight to less than 50% by weight of other copolymerizable vinyl monomer; a polysiloxane rubber elastic body; or a mixture thereof,
   wherein the other copolymerizable vinyl monomer comprises at least one monomer selected from the group consisting of an aromatic vinyl compound, a vinyl cyanide compound, an unsaturated acid derivative, a (meth)acrylate amide derivative, a maleimide derivative, and a vinyl ether monomer.

3. The core-shell polymer-containing epoxy resin composition according to claim 1,
   wherein the shell part of the core-shell polymer is obtained by polymerizing from 5 to 99% by weight of 2-alkoxy ethyl (meth)acrylate, from 1 to 50% by weight of the monomer comprising an epoxy group, wherein the monomer comprising an epoxy group is at least one monomer selected from the group consisting of glycidyl (meth) acrylate, allyl glycidyl ether, and glycidyl alkyl(meth)acrylate, and from 0 to 50% by weight of other vinyl monomer.

4. The core-shell polymer-containing epoxy resin composition according to claim 1,
   wherein the shell part of the core-shell polymer is obtained by polymerizing from 5 to 99% by weight of 2-methoxy ethyl acrylate, from 1 to 50% by weight of the monomer comprising an epoxy group, wherein the monomer comprising an epoxy group is at least one monomer selected from the group consisting of glycidyl (meth)acrylate, allyl glycidyl ether, and glycidyl alkyl (meth) acrylate, and from 0 to 50% by weight of other vinyl monomer.

5. The core-shell polymer-containing epoxy resin composition according to claim 1,
   wherein the shell part of the core-shell polymer has the glass transition temperature of less than 20° C.

6. The core-shell polymer-containing epoxy resin composition according to claim 1,
   wherein the core-shell polymer comprises an intermediate layer between the core part and the shell part, and
   wherein the intermediate layer is obtained by polymerizing from 30 to 100% by weight of a multifunctional monomer and from 0 to 70% by weight of other vinyl monomer.

7. A cured product of the core-shell polymer-containing epoxy resin composition according to claim 1, wherein the core-shell polymer is dispersed as a primary particle in the cured product.

8. A method for preparing a core-shell polymer-containing epoxy resin composition, the method comprising:
   mixing an aqueous media dispersion in which a core-shell polymer is dispersed in an aqueous media with an organic solvent having a solubility to water at 20° C. of from 5% by weight to 40% by weight, and mixing the resulting mixture with excess water such that a slurry solution comprising floating aggregates of the core-shell polymer is obtained;

separating the floating aggregates of the core-shell polymer from a liquid phase to collect the core-shell polymer;

mixing the collected core-shell polymer with an organic solvent such that a dispersion containing the core-shell polymer and the organic solvent is prepared;

mixing the dispersion containing the core-shell polymer and the organic solvent with an epoxy resin; and distilling the organic solvent from the mixture of the dispersion containing the core-shell polymer and the epoxy resin, thereby preparing the core-shell polymer-containing epoxy resin composition, wherein the core-shell polymer-containing epoxy resin composition comprises:

the epoxy resin; and from 1 to 100 parts by weight of the core-shell polymer with respect to 100 parts by weight of the epoxy resin, wherein the core-shell polymer has a volume average particle diameter of from 0.01 to 1 μm, a core part of the core-shell polymer has a glass transition temperature of less than 0° C., a shell part of the core-shell polymer has a glass transition temperature of less than 25° C., wherein the shell part of the core-shell polymer is obtained by polymerizing from 5 to 99% by weight of at least one monomer selected from the group consisting of alkoxy alkyl (meth)acrylate, methyl acrylate, ethyl acrylate, from 1 to 50% by weight of a monomer comprising an epoxy group, wherein the monomer comprising an epoxy group is at least one monomer selected from the group consisting of glycidyl (meth)acrylate, allyl glycidyl ether, and glycidyl alkyl (meth)acrylate, and from 0 to 50% by weight of other vinyl monomer, and wherein the epoxy resin comprises at least one polyepoxide selected from the group consisting of a polyglycidyl ether, a polyglycidylamine compound, an alicyclic epoxy resin, an addition reaction product of polyhydric alcohols and epichlorohydrin, a halogenated epoxy resin, and a hompolymer or copolymer of monomers containing unsaturated monoepoxide.

9. The core-shell polymer-containing epoxy resin composition according to claim 1,
wherein the epoxy resin further comprises at least one selected from the group consisting of polyalkylene glycol diglycidyl ether, glycol diglycidyl ether, a diglycidyl ester of aliphatic polybasic acid, a glycidyl ether of polyvalent aliphatic alcohol, and divinylbenzene dioxide.

10. The core-shell polymer-containing epoxy resin composition according to claim 1, wherein the epoxy resin is at least one of a bisphenol A epoxy resin and a bisphenol F epoxy resin.

11. The core-shell polymer-containing epoxy resin composition according to claim 1,
wherein a weight ratio of the core part to the shell part of the core-shell polymer is from 50/50 to 99/1.

12. The core-shell polymer-containing epoxy resin composition according to claim 2, wherein
the core part of the core-shell polymer comprises the rubber elastic body,
the diene monomer forming the rubber elastic body is at least one of butadiene, isoprene, and chroloprene, and
the (meth)acrylate ester monomer forming the rubber elastic body is at least one of butylacrylate, 2-ethylhexylacrylate, and lauryl methacrylate.

13. The core-shell polymer-containing epoxy resin composition according to claim 6, wherein the multifunctional monomer is at least one selected from the group consisting of divinyl benzene, butanediol di(meth)acrylate, triallyl (iso) cyanurate, allyl (meth)acrylate, diallyl itaconic acid, and diallyl phthalic acid.

14. The core-shell polymer-containing epoxy resin composition according to claim 1, further comprising:
at least one of a curing agent, a strengthening agent, a radically curable resin, and a filler.

15. The core-shell polymer-containing epoxy resin composition according to claim 1, wherein
the core-shell polymer has the volume average particle diameter of from 0.05 to 0.8 μm,
the core part of the core-shell polymer has the glass transition temperature of less than −10° C., and
the shell part of the core-shell polymer has the glass transition temperature of less than 20° C.

16. The core-shell polymer-containing epoxy resin composition according to claim 1, wherein
the core part of the core-shell polymer has the glass transition temperature of less than −20° C., and
the shell part of the core-shell polymer has the glass transition temperature of less than 0° C.

17. The core-shell polymer-containing epoxy resin composition according to claim 1, wherein
the core part of the core-shell polymer has the glass transition temperature of less than −40° C., and
the shell part of the core-shell polymer has the glass transition temperature of less than −40° C.

* * * * *